(12) United States Patent
Miwa et al.

(10) Patent No.: US 9,047,020 B2
(45) Date of Patent: Jun. 2, 2015

(54) STORAGE SYSTEM GROUP INCLUDING SCALE-OUT STORAGE SYSTEM AND MANAGEMENT METHOD THEREFOR

(71) Applicant: Hitachi, Ltd., Tokyo (JP)

(72) Inventors: Kyoko Miwa, Kawasaki (JP); Junichi Hara, Sagamihara (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/487,170

(22) Filed: Sep. 16, 2014

(65) Prior Publication Data

US 2015/0006838 A1 Jan. 1, 2015

Related U.S. Application Data

(63) Continuation of application No. 14/053,703, filed on Oct. 15, 2013, now Pat. No. 8,868,819, which is a continuation of application No. 12/988,008, filed as application No. PCT/JP2010/063027 on Aug. 2, 2010, now Pat. No. 8,589,616.

(30) Foreign Application Priority Data

Jul. 27, 2010 (JP) ................. 2010-168164

(51) Int. Cl.
| | |
|---|---|
| G06F 12/00 | (2006.01) |
| G06F 3/06 | (2006.01) |
| G06F 12/08 | (2006.01) |
| G06F 12/06 | (2006.01) |
| G06F 13/00 | (2006.01) |
| G06F 11/20 | (2006.01) |

(52) U.S. Cl.
CPC ........... *G06F 3/065* (2013.01); *G06F 12/08* (2013.01); *G06F 12/0646* (2013.01); *G06F 13/00* (2013.01); *G06F 3/0607* (2013.01); *G06F 3/0629* (2013.01); *G06F 3/0665* (2013.01); *G06F 3/067* (2013.01); *G06F 11/2069* (2013.01); *G06F 11/2071* (2013.01); *G06F 3/0614* (2013.01); *G06F 3/0683* (2013.01); *G06F 3/0619* (2013.01); *G06F 2201/84* (2013.01)

(58) Field of Classification Search
None
See application file for complete search history.

(56) References Cited

U.S. PATENT DOCUMENTS

| | | |
|---|---|---|
| 2004/0249937 A1 | 12/2004 | Tachihara et al. |
| 2004/0267829 A1 | 12/2004 | Hirakawa et al. |

(Continued)

FOREIGN PATENT DOCUMENTS

| | | |
|---|---|---|
| JP | 2004-362144 A | 12/2004 |
| JP | 2005-18506 A | 1/2005 |

(Continued)

*Primary Examiner* — Midys Rojas
(74) *Attorney, Agent, or Firm* — Mattingly & Malur, P.C.

(57) ABSTRACT

A management system is coupled to a storage system group including a scale-out storage system (a virtual storage system). The management system has storage management information, which includes information denoting, for each storage system, whether or not a storage system is a component of a virtual storage system. The management system, based on the storage management information, determines whether or not a first storage system is a component of a virtual storage system, and in a case where the result of this determination is affirmative, identifies, based on the storage management information, a second storage system, which is a storage system other than the virtual storage system that includes the first storage system, and allows a user to perform a specific operation only with respect to this second storage system.

15 Claims, 31 Drawing Sheets

(56) References Cited

U.S. PATENT DOCUMENTS

| | | |
|---|---|---|
| 2008/0320219 A1 | 12/2008 | Okada et al. |
| 2009/0031320 A1 | 1/2009 | Nakagawa et al. |
| 2009/0094403 A1 | 4/2009 | Nakagawa et al. |

FOREIGN PATENT DOCUMENTS

| | | |
|---|---|---|
| JP | 2009-32014 A | 2/2009 |
| JP | 2009-93316 A | 4/2009 |

FIG. 7

| Volume ID | Volume type | Actual storage ID | Actual volume ID | Capacity | Pair ID |
|---|---|---|---|---|---|
| VOL D1 | Actual | N/A | N/A | 10G | PAIR1 |
| VOL D2 | Actual | N/A | N/A | 10G | PAIR2 |
| VOL D3 | Virtual | Storage E | VOL E3 | 10G | N/A |
| ... | ... | ... | ... | | |

FIG. 8

| Volume set ID | Container time | Number of volume sets | Actual volume set ID | Actual storage ID |
|---|---|---|---|---|
| Set A | 10:00 | 2 | Set D | Storage D |
| | | | Set E | Storage E |
| ... | ... | | ... | |

| Volume set ID | Number of volumes | Volume ID | Partner storage ID | Partner volume set ID | Latest data reflection time |
|---|---|---|---|---|---|
| Set D | 2 | VOL D1, VOL D2 | Storage F | Set F | 10:05 |
| ... | ... | ... | ... | ... | ... |

| Pair ID | Volume ID | Volume set ID | Partner storage ID | Partner volume ID |
|---|---|---|---|---|
| PAIR01 | VOL D1 | Set D | Storage F | VOL F1 |
| .... | ... | ... | ... | ... |

FIG. 11

| Volume ID | Write destination address | Write data length | Write data cache pointer | Sequential number | Write time | Remote copy requirement |
|---|---|---|---|---|---|---|
| VOL D1 | 0x01 | 10 | 1111 | 55 | 10:05 | Required |
| ... | .... | .... | .... | .... | .... | .... |

FIG. 12

| Storage ID | Scale-out availability | Actual storage ID | Representative storage ID |
|---|---|---|---|
| Storage A | ON | Storage D, Storage E | Storage D |
| Storage B | OFF | Storage B | Storage B |
| Storage C | ON | Storage F, Storage G | Storage F |
| ... | ... | ... | ... |

| 21021 | 21022 | 21023 | 21024 | 21025 | 21026 | 21027 |
|---|---|---|---|---|---|---|
| VOL D1 | Storage A | ON | Storage D | Actual | N/A | N/A |
| VOL D2 | Storage A | ON | Storage D | Actual | N/A | N/A |
| VOL D3 | Storage A | ON | Storage D | Virtual | VOL E3 | Storage E |
| ... | ... | ... | | ... | ... | ... |
| VOL E1 | Storage A | ON | Storage E | Virtual | VOL D1 | Storage D |
| VOL E2 | Storage A | ON | Storage E | Virtual | VOL D2 | Storage D |
| VOL E3 | Storage A | ON | Storage E | Actual | N/A | N/A |
| ... | ... | ... | | ... | ... | ... |
| VOL B1 | Storage B | OFF | Storage B | N/A | N/A | N/A |
| ... | ... | ... | | ... | ... | ... |
| VOL F1 | Storage C | ON | Storage F | Actual | N/A | N/A |
| VOL F2 | Storage C | ON | Storage F | Actual | N/A | N/A |
| ... | ... | | | ... | ... | ... |
| VOL G1 | Storage C | ON | Storage G | Actual | N/A | N/A |
| ... | ... | ... | | ... | ... | ... |

| 21031 | 21032 | 21033 | 21034 | 21035 | 21036 | 21037 | 21038 |
|---|---|---|---|---|---|---|---|
| Set A | Storage A | Set C | Storage C | Virtual | Set D, Set E | N/A | N/A |
| Set B | Storage B | Unregis-tered | Unregis-tered | Virtual | Set O | N/A | N/A |
| Set C | Storage C | Set A | Storage A | Virtual | Set F, Set G | N/A | N/A |
| Set D | Storage D | Set F | Storage F | Actual | N/A | ON | Set A |
| Set E | Storage E | Set G | Storage G | Actual | N/A | ON | Set A |
| Set F | Storage F | Set D | Storage D | Actual | N/A | ON | Set B |
| Set G | Storage G | Set G | Storage G | Actual | N/A | ON | Set B |

STORAGE SYSTEM GROUP INCLUDING SCALE-OUT STORAGE SYSTEM AND MANAGEMENT METHOD THEREFOR

This is a continuation application of U.S. Ser. No. 14/053,703, filed Oct. 15, 2013 which is a continuation of U.S. Ser. No. 12/988,008, filed Oct. 15, 2010, (now U.S. Pat. No. 8,589,616) which is a 371 of International Application Number PCT/JP2010/063027, filed Aug. 2, 2010, which claims priority to JP Application No. 2010-168164, filed Jul. 27, 2010. The entire disclosures of all of these applications are hereby incorporated by reference.

TECHNICAL FIELD

The present invention relates to a storage system group including a scale-out storage system configured by a plurality of storage systems, and a management method therefor.

BACKGROUND ART

As business activities come to rely more and more on information systems, losses associated with system shutdowns are becoming enormous. As a result of this, greater importance is being attached to technologies that do not shut down a system or rapidly restore a system when deficiencies such as a system failure or damage occur.

For example, storage cluster technology is disclosed in Patent Literature 1. In storage cluster technology, data in a first logical volume of a first storage system is copied to a second logical volume of a second storage system. In a case where a failure occurs in the first storage system, a host computer is able to access the data in the second logical volume of the second storage system by switching from an access path to the first logical volume to an access path to the second logical volume. Furthermore, in the following explanation, a combination of the logical volume that is the data copy source (copy source volume) and the logical volume that becomes the data copy destination (copy destination volume) will be called a "remote copy pair".

Also, in Patent Literature 2, disaster recovery technology for rapidly restoring a system in a case where the entire system at a site shuts down due to a disaster or the like is disclosed. According to the disaster recovery technology, a remote copy pair comprising a first logical volume of a first storage system and a second logical volume of a second storage system, which is used when the first storage system is unable to be used, is configured. This enables the second storage system to continue operating even when the first storage system has been damaged. Furthermore, in the following explanation, a first storage system that is run during normal operations may be called a "primary storage system", and a second storage system that is used in place of the first storage system may be called a "secondary storage system".

CITATION LIST

Patent Literature

[PTL 1]
Japanese Patent Application Laid-Open No. 2009-32014
[PTL 2]
Japanese Patent Application Laid-Open No. 2005-18506

SUMMARY OF INVENTION

Technical Problem

A scale-out storage system comprising multiple storage systems (will be called a "virtual storage system" hereinafter) is known. In accordance with a virtual storage system, the capacity of the virtual storage system-provided resource can be flexibly expanded by replenishing the storage system.

The joining together of remote copy pairs of storage systems in the same virtual storage system will be considered here. Specifically, for example, it is supposed that the following environment exists.

(*) One virtual storage system comprises a first storage system and a second storage system.
(*) There is a first and a second remote copy pair.
(*) Copy source volumes and copy destination volumes are mixed together in both the first and the second storage systems. Specifically, for example, a first remote copy pair is configured in a first copy source volume and a first copy destination volume, and a second remote copy pair is configured in a second copy source volume and a second copy destination volume. The first storage system comprises the first copy source volume and the second copy destination volume. The second storage system comprises the first copy destination volume and the second copy source volume.
(*) A single consistency group is configured using the first and the second remote copy pairs. Specifically, the write sequence (update sequence) of the write data to the first and the second copy source volumes and the replication sequence (reflection sequence) of the write data to the first and the second copy destination volumes are the same.

When the first storage system is damaged in an environment like this, an operation that uses the first and the second copy source volumes is switched over to an operation that uses the first and the second copy destination volumes.

However, since the second copy destination volume is in the damaged first storage system, it is not possible to restore the data in the second copy destination volume.

The user must configure the remote copy pair such that a problem like this does not occur. For this reason, the user must carry out management while being aware of the corresponding relationship between the virtual storage system and the storage systems that comprise same. This is a burden on the user.

Therefore, an object of the present invention is to lessen the management burden on the user who manages a storage group including a scale-out storage system.

Solution to Problem

A management system is coupled to a storage system group comprising a virtual storage system, which is a scale-out storage system comprising multiple storage systems. The management system comprises storage management information comprising information that denotes whether or not a storage system is a component of the virtual storage system for each storage system. The management system, based on the storage management information, determines whether or not a first storage system is a component of the virtual storage system, and in a case where the result of this determination is affirmative, identifies on the basis of the storage management information a second storage system, which is a storage system other than the virtual storage system comprising the first storage system, and only allows the user to perform a specific operation with respect to this second storage system.

Advantageous Effects of Invention

It is possible to manage a virtual storage system comprising multiple storage systems by treating it as a single storage system. This makes it possible to lessen the management

BRIEF DESCRIPTION OF DRAWINGS

FIG. 7 is a diagram showing an example of the configuration of a volume management table of the first example.

FIG. 8 is a diagram showing an example of the configuration of a volume set representative management table of the first example.

FIG. 9 is a diagram showing an example of the configuration of a volume set management table of the first example.

FIG. 10 is a diagram showing an example of the configuration of a copy pair management table of the first example.

FIG. 11 is a diagram showing an example of the configuration of a write data management table of the first example.

FIG. 12 is a diagram showing an example of the configuration of a storage management table of the first example.

FIG. 13 is a diagram showing an example of the configuration of a volume consolidation management table of the first example.

DESCRIPTION OF EMBODIMENT

A management computer of a scale-out storage apparatus related to an embodiment of the present invention will be explained below by using the drawings.

In the following explanation, various types of information will be explained using the expression "xxx table", but these various types of information may be expressed using a data structure other than a table. To show that the information is not dependent on the data structure, "xxx table" may be called "xxx information".

Further, an ID (identifier) will be used for identifying an element in the following explanation, and a name, a number, or the like may be used as the ID.

In the following explanation, a "program" may be used as the subject in explaining a process, but since a prescribed process is performed in accordance with a program being executed by a processor (for example, a CPU (Central Processing Unit)) while using a storage resource (for example, a memory) and/or a communication interface device (for example, a communication port) as needed, the subject of the processing may also be the processor. A process that is explained with a program as the subject may be a process that is performed by the management system. The processor may comprise a hardware circuit that processes either all or a portion of a process performed by the processor. A computer program may be installed in respective computers from a program source. The program source, for example, may be a program delivery server or a storage medium.

The management system may comprise one or more computers. Specifically, for example, in a case where the management computer either displays information or sends display information to a remote computer, the management computer is a management system. Furthermore, for example, in a case where the same functions as those of the management computer are realized using multiple computers, the relevant multiple computers (may include a display computer in a case where a display computer performs a display) are the management system.

EXAMPLE 1

Figure 1:
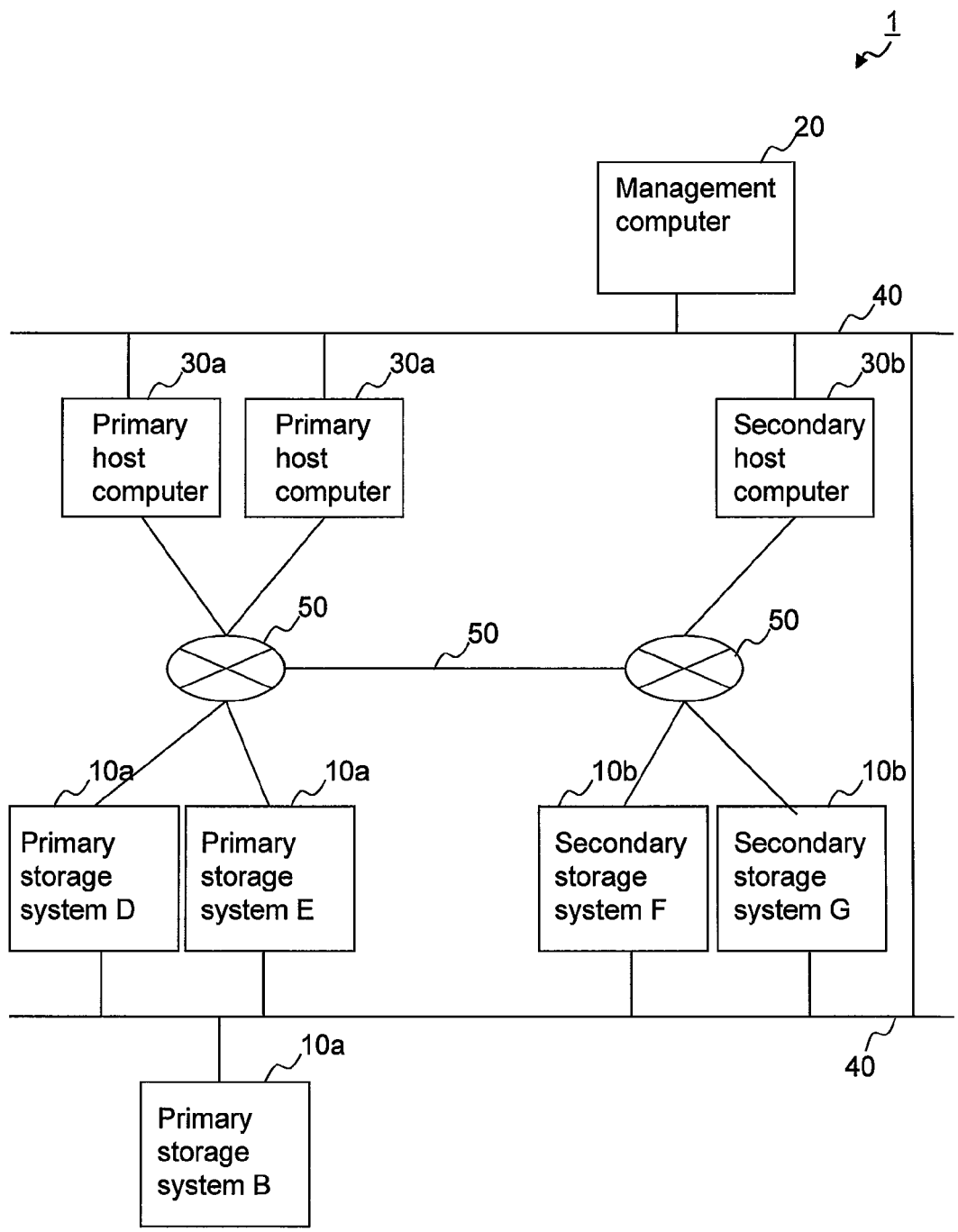
FIG. 1 is a diagram showing an example of a computer system of a first example.

FIG. 1 is a diagram showing an example of the configuration of a computer system of a first example.

A computer system 1 comprises a primary storage system 10a, a secondary storage system 10b, a management computer 20, a primary host computer 30a, a secondary host computer 30b, a management network 40, and a storage network 50.

The primary host computer 30a and the primary storage system 10a are coupled together via the storage network 50. Similarly, the secondary host computer 30b and the secondary storage system 10b are also coupled together via the storage network 50. Furthermore, the primary storage system 10a and the secondary storage system 10b are also coupled together via the storage network 50.

The primary host computer 30a, the primary storage system 10a, the secondary host computer 30b, and the secondary storage system 10b are coupled to the management computer 20 via the management network 40.

Furthermore, in the example of FIG. 1, multiple primary host computers 30a and secondary host computers 30b are shown, but there can also be one each. Also in the example of FIG. 1, a single management computer 20 is shown, but there may also be multiple management computers 20.

The storage network 50 is a network system used primarily for communications based on an IO (Input/Output) request carried out between the primary host computer 30a and the primary storage system 10a, and communications based on an IO request carried out between the secondary host computer 30b and the secondary storage system 10b. Furthermore, the storage network 50 is also used for remote copy-based communications between the primary storage system 10a and the secondary storage system 10b.

For example, either a LAN (Local Area Network) or a SAN (Storage Area Network) may be used as the storage network 50. The storage network 50 may be comprised of a network switch and a hub. In this example, the storage network 50 is a fibre channel protocol-based SAN (FC (Fibre Channel)-SAN).

The management network 40 is used when the management computer 20 is managing the primary host computer 30a, the primary storage system 10a, the secondary host computer 30b, and the secondary storage system 10b. In this example, the management network 40 is an IP (Internet Protocol)-based LAN. However, this does not negate the fact that the storage network 50 and the management network 40 can be formed on a single network. For example, in a case where the storage network 50 comprises an IP protocol-based network, the storage network 50 and the management network 40 can also be formed on a single network system.

Figure 2:
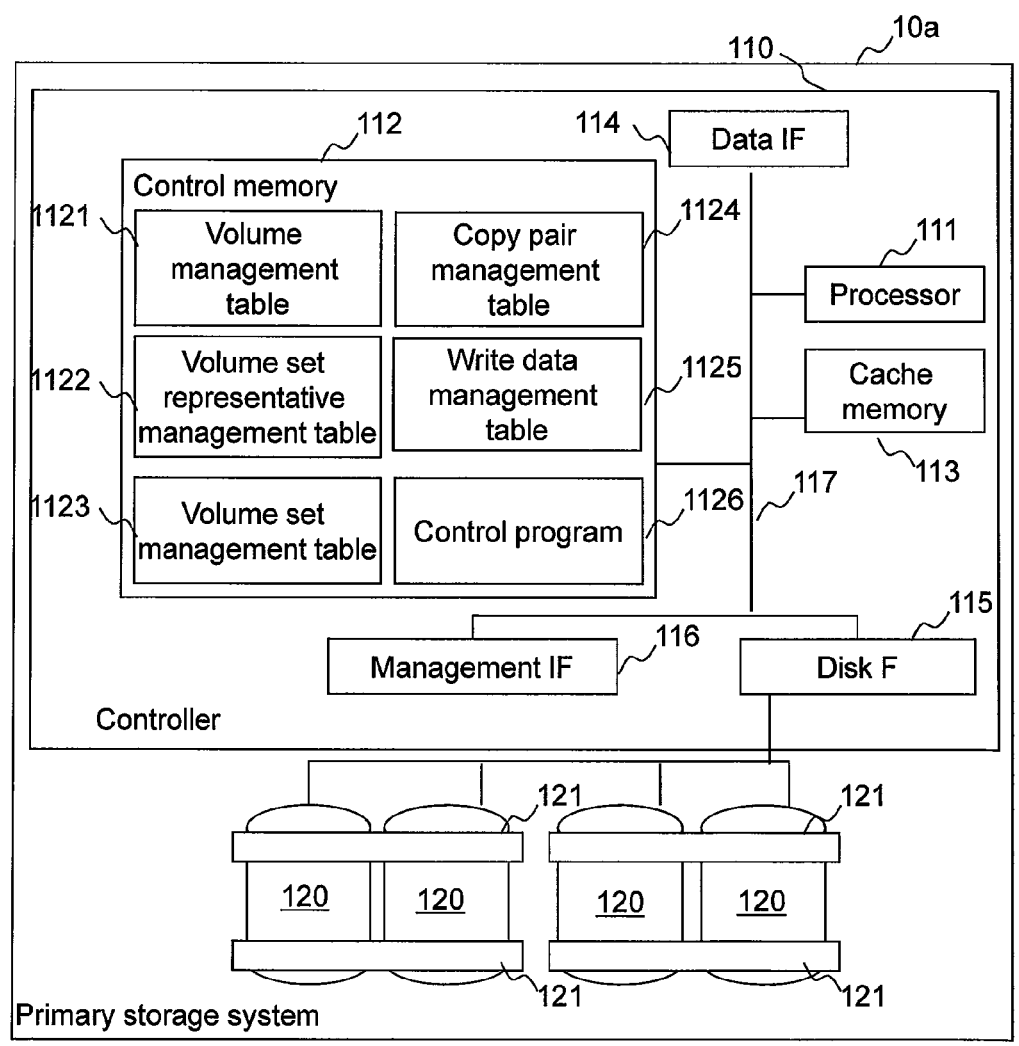
FIG. 2 is a diagram showing an example of the configuration of either a primary or a secondary storage system of the first example.

FIG. 2 is a diagram showing an example of the configuration of either a primary or a secondary storage system of the first example.

Since the configuration of the secondary storage system 10b is practically identical to that of the primary storage system 10a, an explanation of the former will be omitted.

However, different roles are allocated to the primary storage system 10a and the secondary storage system 10b from the standpoint of operations. That is, the primary storage system 10a is the storage system that is run during normal operations. Alternatively, the secondary storage system 10b stores a replication of the data of the primary storage system 10a, and is operated as an alternative system when the storage system 10a is unable to be used due to a disaster, maintenance, or the like.

The primary storage system 10a comprises a controller 110 and a disk apparatus 120.

The disk apparatus 120 stores data in accordance with a write request from the primary host computer 30a. The disk apparatus 120 is a disk-type physical storage device (for example, a HDD (Hard Disk Drive)). Another physical storage device (for example, a flash memory device) may also be used as the physical storage device.

The controller 110 controls the primary storage system 10a in its entirety. For example, the controller 110 writes data to the disk apparatus 120, reads data from the disk apparatus 120, and controls a remote copy from the primary storage system 10a to the secondary storage system 10b.

The controller 110 also provides a storage area of the disk apparatus 120 to the primary host computer 30a as one or more logical volume 121. As shown in the drawing, there may be multiple disk apparatuses 120. Furthermore, the controller 110 may use RAID (Redundant Arrays of Independence Disks) technology, and may comprise multiple logical volumes 121 based on multiple disk apparatuses 120. Hereinafter, a logical volume 121 may simply be called a "volume".

The controller 110, as shown in the drawing, comprises a processor (for example, a CPU (Central Processing Unit)) 111, a memory (hereinafter control memory) 112, a cache memory 113, a data interface (data IF) 114, a disk interface (disk IF) 115, and a management interface (management IF) 116.

These components (111, 112, 113, 114, 115 and 116) are coupled together via an internal network 117. These respective components may be duplexed by using a redundant configuration.

The processor 111 performs various processes in accordance with executing a control program 1126 that is stored in the control memory 112.

In addition to the above-mentioned control program 1126, tables that the processor 111 needs when executing the control program 1126 are also stored in the control memory 112.

Specifically, for example, the control memory 112 stores a volume management table 1121, a volume set management table 1123, a copy pair management table 1124, and a write data management table 1125.

Furthermore, a volume set representative management table 1122 is stored in a storage system defined as the representative storage of a group. Hereinbelow, the storage system defined as the group representative storage will be called the "representative storage system". Only one of the storage systems included in the virtual storage system is registered as the representative storage system.

In a storage system that is not a virtual storage system, this storage system is registered as being the representative storage system. Furthermore, the respective tables provided by the primary storage system 10a will be described further below.

The control program 1126 is for controlling the entire primary storage system 10a, and processes an IO request from the primary host computer 30a, a remote copy, and a storage management request from the management computer 20.

The cache memory 113 temporarily stores data that is to be written to the disk apparatus 120 and data read from the disk apparatus 120 (actual data, and write/read time management information).

The data interface 114 is for carrying out communications between the primary host computer 30a and the primary storage system 10a, which are coupled via the storage network 50.

Specifically, the data interface 114 is used when receiving an IO request (for example, a read request or a write request) from the primary host computer 30a, and sending data, which has been read from the disk apparatus 120, to the host computer 30a. This interface 114 is also used for carrying out communications between the storage systems that comprise the same virtual storage system. In addition, the data interface 114 is also used when sending and receiving the data exchanged between the primary storage system 10a and the secondary storage system 10b when carrying out a remote copy.

The disk interface 115 is used for carrying out communications between the disk apparatus 120 (the apparatus coupled via the internal network 117) and the cache memory 113. The disk interface 115, for example, enables the control program 1126 to fetch data stored in the cache memory 113 and store same in the disk apparatus 120, and to read data from the disk apparatus 120 and write same to the cache memory 113.

The primary storage system 10a uses the management interface 116 when carrying out communications with the management computer 20 (the computer coupled via the management network 40). The management interface 116 is used when the control program 1126 receives an instruction from the management computer 20, and sends primary storage system 10a table information to the management computer 20.

Figure 3:
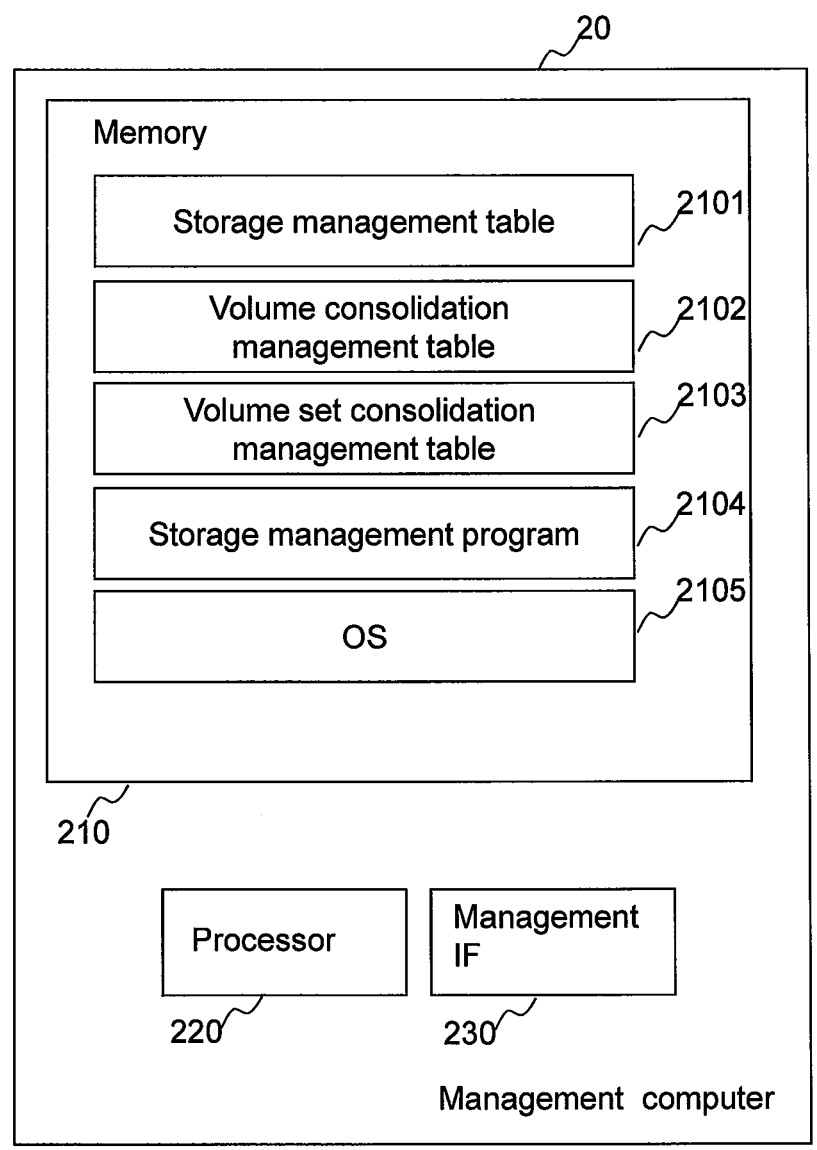
FIG. 3 is a diagram showing an example of the configuration of a management computer of the first example.

FIG. 3 is a diagram showing an example of the configuration of a management computer of the first example.

The management computer 20 is for managing the primary storage system 10a and the secondary storage system 10b. The management computer 20 comprises a memory 210, a processor (for example, a CPU) 220, and a management interface 230. The memory 210, the processor 220, and the management interface 230 are coupled together via an internal network that has been omitted from the drawing.

The processor 220 performs various processing by executing a program stored in the memory 210.

The memory 210 stores a storage management table 2101, a volume consolidation management table 2102, a volume set consolidation management table 2103, a storage management program 2104, and an OS (Operating System) 2105.

The storage management table 2101, the volume consolidation management table 2102, and the volume set consolidation management table 2103 are used by the storage management program 2104 that is executed by the processor 220. Each table will be explained in detail further below.

The storage management program 2104 provides the user with a user interface for managing the primary storage system 10a and the secondary storage system 10b. Furthermore, the storage management program 2104 performs management (for example, a setting, an execution instruction, and monitoring of the operational status) with respect to the primary storage system 10a and the secondary storage system 10b based on a user operation. For example, the storage management program 2104 provides a user interface, receives an instruction, such as construct remote copy environment and operate on copy pair, from the user via this user interface, and sends this instruction to the primary storage system 10a and the secondary storage system 10b.

The OS 2105 is a program for controlling all of the processing performed by the management computer 20.

Furthermore, the management computer 20 may comprise a display device and an input device that are not shown in the drawing.

The display device, for example, is a liquid crystal display device, and the input device, for example, is either a keyboard or a mouse. The management computer 20 may also comprise an apparatus that integrates the display device and the input device (for example, a touch panel-type display apparatus). In the following explanation, it is supposed that a screen and other such information will be displayed on the display device, and that the user will use the input device to perform a desired operation.

Figure 4:
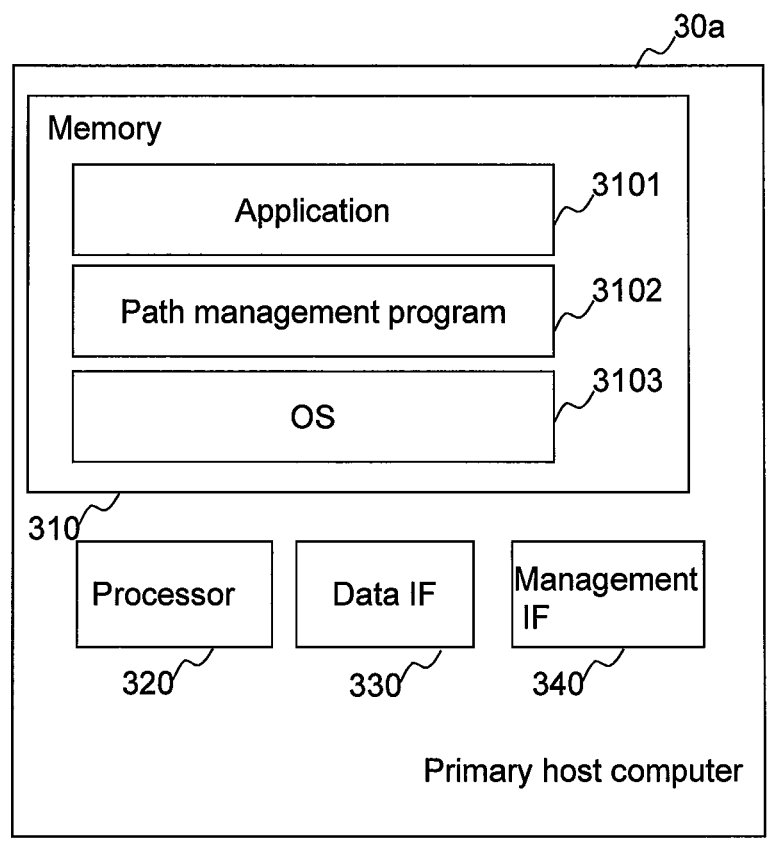
FIG. 4 is a diagram showing an example of the configuration of either a primary or a secondary host computer of the first example.

FIG. 4 is a diagram showing an example of the configuration of either a primary or a secondary host computer of the first example.

Since the secondary host computer 30b has the same configuration as the primary host computer 30a, an explanation thereof will be omitted.

However, different roles are allocated to the primary host computer 30a and the secondary host computer 30b from the operational standpoint. The primary host computer 30a operates during normal operations, and the secondary host computer 30b is used as an alternative system when the primary host computer 30a is unable to be used due to a disaster, maintenance, or the like.

The primary host computer 30a, for example, forms the core of a prescribed business system (for example, a banking business system or an airline seat reservation business system). The primary host computer 30a comprises a memory 310, a processor 320, a data interface 330, and a management interface 340. The memory 310, the processor 320, the data interface 330, and the management interface 340 are coupled together via an internal network that has been omitted from the drawing.

The memory 310 stores an application 3101, a path management program 3102, and an OS 3103.

The application 3101 and the path management program 3102 are executed by the processor 320.

The application 3101, for example, is a program for managing a database, and based on the data stored in the volume 121, performs a data write to the volume 121 or a data read from the volume 121.

The path management program 3102 selectively switches the path for the primary host computer 30a to access data disposed in the primary storage system 10a. In a case where multiple paths for accessing the data are registered, when one path is unable to be used due to a failure or the like, the data can be accessed using another path.

The OS 3103 is a program for controlling all of the processing performed by the primary host computer 30a.

Next, an overview of a scale-out storage system will be explained.

A scale-out storage system is a single virtual storage system in which multiple storage systems are interlinked. The configuration of a scale-out storage system can be made larger or smaller by adjusting the number of interlinked storage systems.

Figure 5:
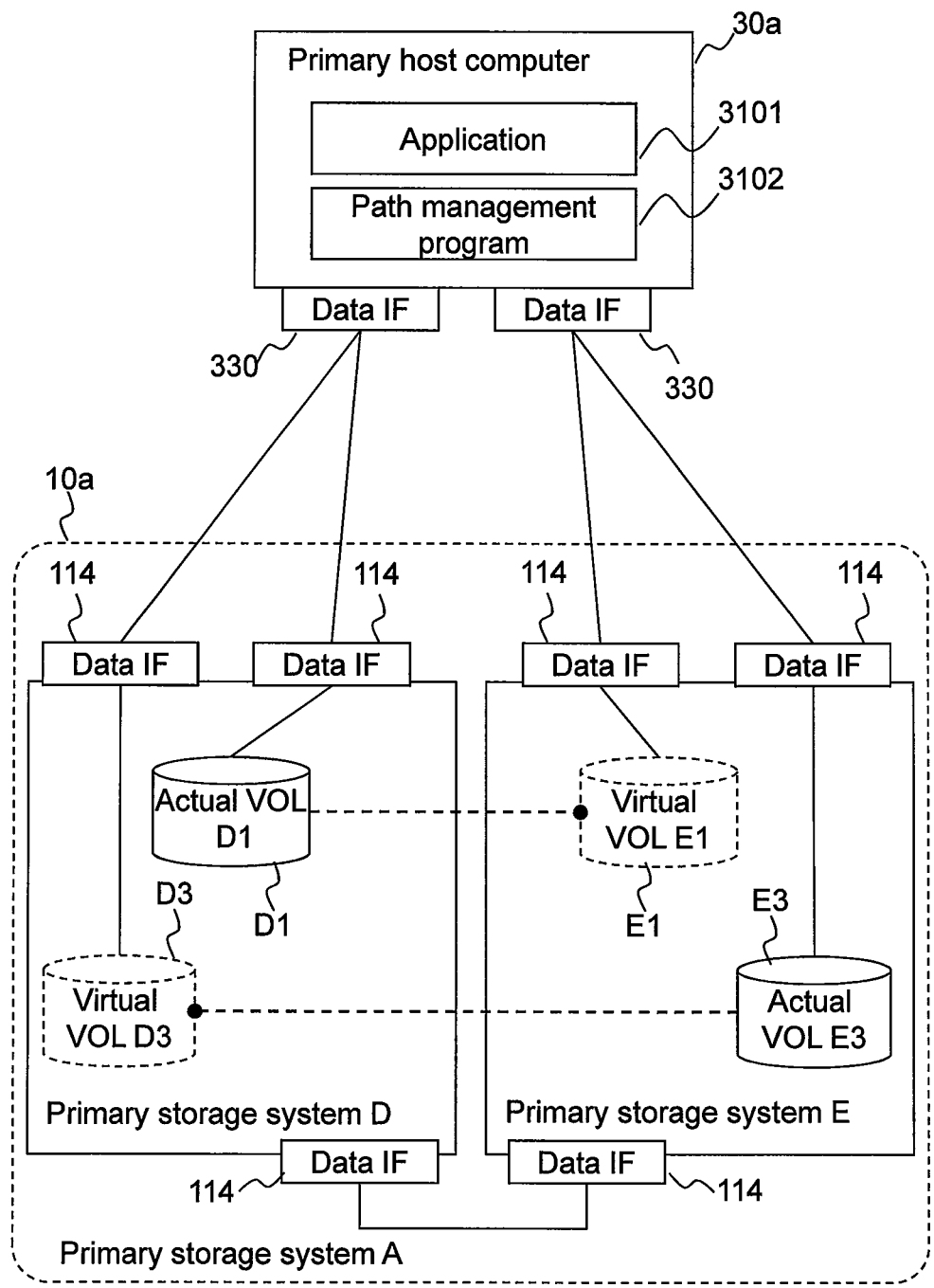
FIG. 5 is a diagram showing an overview of a scale-out storage system of the first example.

FIG. 5 is a diagram showing an overview of a scale-out storage system of the first example.

A primary storage system A (10a) described in FIG. 5 is a scale-out storage system, and comprises two storage systems, i.e. primary storage system D and primary storage system E.

According to this drawing, the primary storage system D comprises an actual volume D1. The actual volume D1 is associated with a virtual volume E1 of the primary storage system E. Furthermore, the primary storage system E comprises an actual volume E3. The actual volume E3 is associated with a virtual volume D3 of the primary storage system D. The actual volumes D1 and E3 and the virtual volumes E1 and D3 are respectively allocated by the primary host computer 30a. An "actual volume" is either all or a portion of the storage space of one or more disk apparatuses 120 (for example, a RAID group). A "virtual volume" is a virtual logical volume that is not based on the disk apparatus 120.

Next, an overview of the processing performed when the primary storage system A receives an IO request from the primary host computer 30a with respect to a volume will be explained.

In general, when a primary storage system receives an IO request (either a write request or a read request) with respect to a volume from a primary host computer, the primary storage system determines whether this request is an IO request with respect to an actual volume or an IO request with respect to a virtual volume. In the case of an IO request with respect to an actual volume, the primary storage system performs the IO of the data to the I/O destination actual volume and ends the processing. Alternatively, in the case of an IO request with respect to a virtual volume, the primary storage system identifies the actual volume that is associated with the I/O destination virtual volume, and transfers the IO request with respect to the identified actual volume to the storage system that comprises this actual volume.

A specific explanation will be given using the configuration of FIG. 5 as an example. In a case where the primary storage system E receives a write request from the primary host computer 30a with respect to the virtual volume E1, the primary storage system E executes a write to the actual volume D1 by way of the virtual volume E1. Similarly, in a case where the primary storage system E receives a read request from the primary host computer 30a with respect to the virtual volume E1, the primary storage system E reads the data from the actual volume D1, and sends the read data to the primary host computer 30a by way of the virtual volume E1.

By contrast, in a case where the primary storage system D receives a write request with respect to the actual volume D1 directly from the primary host computer 30a (without going through the virtual volume E1), the primary storage system D writes the data to the actual volume D1. Similarly, in a case where the primary storage system D receives a read request with respect to the actual volume D1 directly from the primary host computer 30a (without going through the virtual volume E1), the primary storage system D reads the data from the actual volume D1, and sends the read data to the host computer 30a.

That is, the primary host computer 30a has two paths via which to access the respective actual volumes D1 (E3), a path for directly accessing the respective actual volumes D1 (E3), and a path for accessing the respective actual volumes D1 (E3) by way of the associated virtual volumes E1 (D3). The path management program 3102 disposed in the primary host computer 30a selectively switches these paths to access the actual volume D1 (E3). With a configuration like this, since the primary host computer 30a is able to select either the path that directly accesses the actual volume D1 (E3) or the path that access the actual volume D1 (E3) by way of the virtual volume E1 (D3), even if one path fails, the system is able to continue to operate provided the other path does not fail. Furthermore, as seen from the perspective of primary host computer 30a, the primary storage system D and the primary storage system E can be viewed as the single virtual storage system A.

Next, an overview of a remote copy carried out between a primary storage system and a secondary storage system will be explained.

A remote copy is the replication of the data of a primary storage system in a secondary storage system so that operations will be able to continue using the secondary storage system even if a failure, maintenance or the like makes it impossible to use the primary storage system.

A remote copy is realized in accordance with the following operations.
(*) An "initial copy" via which all the data stored in the volume of the primary storage system is replicated in the volume of the secondary storage system.
(*) An "update copy" via which, in a case where a write request is generated with respect to the volume of the primary storage system, the write data (the data according to this write request) is transferred to the secondary storage system E and the volume of the secondary storage system E is updated in accordance with the transferred write data.

Furthermore, a volume pair (a combination of a copy source volume and a copy destination volume) for a remote copy will be called a "remote copy pair" in this example.

In this example, a group comprising one or more copy source volumes included in one or more remote copy pairs may be called either a "copy source volume set" or simply a "volume set", and a group comprising one or more copy destination volumes included in one or more remote copy pairs may be called either a "copy destination volume set" or simply a "volume set".

The sequence in which write data is updated to one or more copy source volumes in a copy source volume set is the same as the sequence in which the write data is reflected in the one or more copy destination volumes in the copy destination volume set corresponding to this copy source volume set.

The multiple copy source volumes in one copy source volume set may reside in different multiple storage systems. Similarly, the multiple copy destination volumes in one copy destination volume set may reside in different multiple storage systems.

However, in a case where a failure occurs in a primary storage system (for example, in a certain volume) and the primary storage system that is currently operating can no longer be used, the host computer 30a performs an operation for switching the access destination from the primary storage system to a normal secondary storage system. However, the problem is that the system will no longer be able to operate in a case where the switch-destination secondary storage system also has a failed volume. Therefore, as shown in the example of FIG. 6, when creating a remote copy pair, it is necessary to combine actual volumes that are not components of the same virtual storage system.

Figure 6:
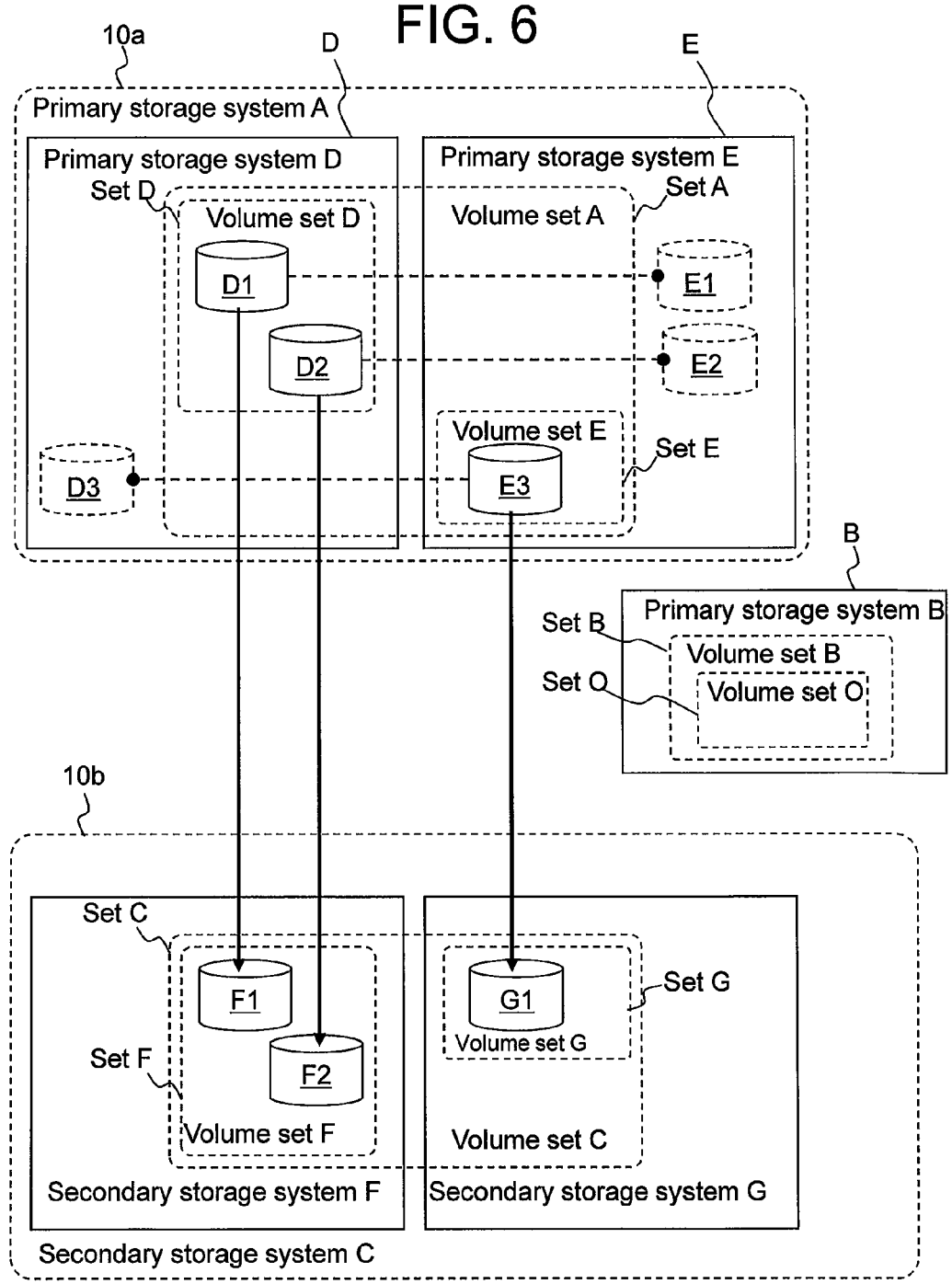
FIG. 6 is a diagram showing one example of the configuration of a storage and a remote copy of the first example.

FIG. 6 is a diagram showing an example of a storage configuration and a remote copy pair configuration of the first example.

This drawing comprises a primary storage system A and a secondary storage system C.

The primary storage system A is a scale-out storage system. The primary storage system A comprises a primary storage system D and a primary storage system E. A primary storage system B is not a scale-out storage system. The secondary storage system C is a scale-out storage system. The secondary storage system C comprises a secondary storage system F and a secondary storage system G.

Actual volumes D1 and D2 of the primary storage system D are respectively associated with virtual volumes E1 and E2 of the primary storage system E. In addition, an actual volume E3 of the primary storage system E is associated with a virtual volume D3 of the primary storage system D.

A volume set A (set A) resides in the primary storage system A. The volume set A (set A) comprises a volume set D (set D) of the primary storage system D and a volume set E (set E) of the primary storage system E. A volume set B (set B) also exists in the primary storage system B.

A volume set C (set C) exists in the secondary storage system C. The volume set C (set C) comprises a volume set F (set F) of the secondary storage system F and a volume set G (set G) of the secondary storage system G.

A volume D1 and a volume D2 exist in the volume set D. The volume D1 and a volume F1, which belongs to the volume set F, form one remote copy pair, and the volume D2 and a volume F2, which belongs to the volume set F, form another remote copy pair.

In addition, a volume E3 exists in the volume set E. The volume E3 and a volume G1, which belongs to the volume set G, form a remote copy pair.

Actual volumes D1, D2 and E3 belong to volume set A (set A) and form remote copy pairs with actual volumes F1, F2 and G1 that belong to volume set C (set C). For this reason, the write data update sequence (write sequence) with respect to the volumes D1, D2 and E3 is the same as the write data reflection sequence (write sequence) with respect to the volumes F1, F2 and G1. For example, in a case where data is written in the order D1→D2→E3 to the actual volumes D1, D2 and E3 of the primary storage system A, the data is written in the order F1→F2→G1 on the secondary storage system C side.

FIG. 7 is a diagram showing an example of the configuration of a volume management table of the first example.

The volume management table 1121 is used by the control program 1126 (refer to FIG. 2) to manage the volume (s) of the primary storage system 10a. There is also a volume management table 1121 in the secondary storage system 10b, but since the configurations are practically the same, the volume management table 1121 of the primary storage system 10a will be explained below.

The volume management table 1121 comprises a volume ID 11211, a volume type 11212, an actual storage ID 11213, an actual volume ID 11214, a capacity 11215, and a pair ID 11216 for each volume.

The volume ID 11211 is an ID used by the control program 1126 to uniquely identify a volume of the primary storage system 10a.

The volume type 11212 is information denoting the type of the volume (for example, a volume is either a virtual volume or an actual volume) identified from the volume ID 11211. The volume type 11212 is "virtual" when the volume is a virtual volume, and is "actual" when the volume is an actual volume.

The actual storage ID 11213 and the actual volume ID 11214 are information that is registered in a case where the volume type 11212 is "virtual". In a case where the volume type 11212 is "virtual", the actual volume ID 11214 is the ID of the actual volume associated with the virtual volume. Furthermore, the actual storage ID 11213 is (the ID of) the actual storage system that comprises the actual volume (the actual volume associated with the virtual volume) identified from the actual volume ID 11214. The "actual storage system" is a storage system that is not a virtual storage system, and specifically, is either a storage system that is included in a virtual storage system, or a storage system that is not included in the virtual storage system.

In a case where the volume type 11212 is "actual", the actual storage ID 11213 and the actual volume ID 11214, for example, are invalid values (for example, "N/A").

The capacity 11215 is information denoting the capacity of the volume identified from the volume ID 11211.

The pair ID 11216 is the ID of the remote copy pair comprising the volume that is identified from the volume ID 11211. In a case where this volume is not included in the remote copy pair, the pair ID 11216, for example, is an invalid value (for example, "N/A").

FIG. 8 is a diagram showing an example of the configuration of a volume set representative management table of the first example.

The volume set representative management table 1122 is used by the control program 1126 (see FIG. 2) to manage a virtual volume set comprising multiple volume sets. The volume set representative management table 1122 exists only in the representative storage system. The control program 1126, based on the volume set representative management table 1122, is able to collectively manage volume sets comprising the volume sets of multiple storage systems.

In the example of FIG. 6, the volume set representative management table 1122, which is disposed in the representative storage system inside the primary storage system A, comprises information related to the volume set A (set A). The volume set representative management table 1122, which is disposed in the representative storage system inside the secondary storage system C, comprises information related to the volume set C (set C).

The volume set representative management table 1122 comprises a volume set ID 11221, a container time 11222, a number of volume sets 11223, an actual volume set ID 11224, and an actual storage ID 11225 for each virtual volume set. The virtual volume set is a virtual volume set comprising multiple volume sets. The virtual volume set, for example, is a consistency group (a group in which the consistency of the data is maintained), and, specifically, for example, comprises one or more copy source volume sets and one or more copy destination volume sets corresponding thereto.

The volume set ID 11221 is an ID used by the control program 1126 to uniquely identify a virtual volume set.

The container time 11222 is information denoting the time at which the processor 111 last wrote data to either of the volumes comprising the virtual volume set (the volume set identified from the volume set ID 11221). The container time 11222 is only registered in the representative management table 1122 of the secondary storage system side.

The number of volume sets 11223 is information denoting the total number of volume sets that comprise the virtual volume set identified by the volume set ID 11221.

The actual volume set ID 11224 is the ID of the actual volume set that comprises the virtual volume set identified from the volume set ID 11221. The "actual volume set" is the volume set that is not the virtual volume set, and, specifically, is the volume set comprising the virtual volume set.

The actual storage ID 11225 is the ID of the storage system comprising the volume set identified from the actual volume set ID 11224.

The total number of actual volume set IDs 11224 (actual storage IDs 11225) is the same as the number denoting the number of volume sets 11223.

FIG. 9 is a diagram showing an example of the configuration of a volume set management table of the first example.

The volume set management table 1123 resides in the primary storage system 10a and in the secondary storage system 10b. The volume set management table 1123 is used by the control program 1126 to manage the volume sets of the primary storage system 10a and the secondary storage system 10b. The configuration of the volume set management table 1123 is the same in both the primary storage system 10a and the secondary storage system 10b, and as such, the following explanation will focus on the configuration of the volume set management table 1123 of the primary storage system 10a (the secondary storage system 10b will be explained as needed).

The volume set management table 1123 comprises a volume set ID 11231, a number of volumes 11232, a volume ID 11233, a partner storage ID 11234, a partner volume set ID 11235, and a latest data reflection time 11236 for each volume set.

The volume set ID 11231 is the ID used by the control program 1126 to uniquely identify the volume set of the primary storage system 10a.

The number of volumes 11232 is information denoting the total number of volumes comprising the volume set (the volume set identified from the volume set ID 11231).

The volume ID 11233 is the ID of the volume included in the volume set (the volume set identified from the volume set ID 11231). The number of IDs registered as the volume ID 11233 is equivalent to the number denoted by the number of volumes 11232.

The partner storage ID 11234 is the ID of a secondary storage system that constitutes the remote copy destination of a primary storage system.

The partner volume set ID 11235 is the ID for identifying the volume set (the volume set of the storage system identified by the partner storage ID 11234), which is the remote copy destination.

The latest data reflection time 11236 is information showing the time at which the processor 111 last wrote data to the volume that belongs to the remote copy destination volume set. The latest data reflection time 11236 is only registered in the volume set management table 1123 of the secondary storage system.

FIG. 10 is a diagram showing an example of the configuration of a copy pair management table of the first example.

The copy pair management table 1124 is used by the control program 1126 to manage the remote copy pair relationship between the volume of the primary storage system 10*a* and the volume of the secondary storage system 10*b*. The same table is also in the secondary storage system 10*b*.

The copy pair management table 1124 comprises a pair ID 11241, a volume ID 11242, a volume set ID 11243, a partner storage ID 11244, and a partner volume ID 11245 for each remote copy pair.

The pair ID 11241 is the ID used by the control program 1126 to uniquely identify the remote copy pair.

The volume ID 11242 is the ID used by the control program 1126 to uniquely identify the copy source volume that belongs to the primary storage system.

The volume set ID 11243 is the ID of the volume set to which the volume identified from the volume ID 11242 belongs.

The partner storage ID 11244 is the ID of the remote copy destination storage system of the volume identified from the volume ID 11242.

The partner volume ID 11245 is the ID of the remote copy destination volume (the volume of the storage system identified from the partner storage ID 11244) of the volume identified from the volume ID 11242.

FIG. 11 is a diagram showing an example of a write data management table of the first example.

The write data management table 1125 is used by the control program 1126 (refer to FIG. 2) to manage information for transferring and reflecting the write data stored in the copy source volume to the copy destination volume.

The write data management table 1125 comprises a volume ID 11251, a write destination address 11252, a write data length 11253, a write data cache pointer 11254, a sequential number 11255, a write time 11256, and a remote copy requirement 11257 for each write data.

The volume ID 11251 is the ID used by the control program 1126 to uniquely identify a write destination volume.

The write destination address 11252 is the address of the write data write destination area (a storage area in the write destination volume).

The write data length 11253 is information denoting the data size of the relevant write data.

The write data cache pointer 11254 denotes the cache area in which the write data is to be stored temporarily.

The sequential number 11255 is a number (a sequential number) denoting the sequence in which data has been written to a volume belonging to the volume set. For example, in a case where a single storage system comprises a first and a second copy source volume set (a set of one or more copy source volumes), there is a separate sequential number for each copy source volume set. Furthermore, in a case where the multiple copy source volumes included in one copy source volume set are in multiple storage systems, for example, the sequential number corresponding to the relevant copy source volume set is used no matter which of these multiple copy source volumes the write data is written to.

The write time 11256 is information denoting the write time of the relevant write data. Furthermore, the write time may be the time (for example, the time denoted by a time stamp of a write request) capable of being acquired from the write data-related management information sent together with the write data from the host computer 30*a*, may be the time at which the write request was received, or may be the time at which the write data was written to the write destination volume (the volume identified from the write request) in accordance with the write request.

The remote copy requirement 11257 is an identifier denoting the presence or absence of a remote copy target. In a case where a remote copy is needed, the remote copy requirement 11257 is "required", and in a case where a remote copy is not needed, the remote copy requirement 11257 is "not required".

FIG. 12 is a diagram showing an example of the configuration of a storage management table of the first example.

The storage management table 2101 is used by the processor 220 (refer to FIG. 3) to manage a storage system that is managed by the storage management program 2104, and the scale-out configuration of each storage system.

The storage management table 2101 comprises a storage ID 2101, a scale-out availability 21012, an actual storage ID 21013, and a representative storage ID 21014.

The storage ID 21011 is an ID for uniquely identifying a storage system that is managed by the storage management program 2104. In the case of a storage system that is a virtual storage system comprising multiple storage systems, the storage ID 21011 is the ID of the virtual storage system.

The scale-out availability 21012 is an identifier denoting whether or not the storage system identified from the storage ID 21011 is a storage system that is capable of scale-out. In a case where the storage system is a scale-out-enabled storage (a virtual storage system), the scale-out availability 21012 is "ON". Alternatively, in a case where the storage system is not a scale-out storage system, the scale-out availability 21012 is "OFF".

The actual storage ID 21013 registers the ID of the storage system comprising the storage system identified from the storage ID 21011. In a case where the storage system is not a scale-out storage, the actual storage ID 21013 is the same ID as the storage ID 21011.

The representative storage ID 21014 is the ID of the storage system that is the representative of one or more storage systems corresponding to one or more IDs registered in the actual storage ID 21013.

According to the example of FIG. 12, a storage system "Storage A" is a virtual storage system comprising a storage system "Storage D" and a storage system "Storage E". The representative storage system in this virtual storage system is the storage system "Storage D".

FIG. 13 is a diagram showing an example of the configuration of a volume consolidation management table of the first example.

The volume consolidation management table 2102 is for managing a volume (the volume managed by the storage management program 2104) of the storage system. The volume consolidation management table 2102 is created based on the storage management table 2101 and the volume management table 1121 (the table 1121 disposed in each storage system).

The volume consolidation management table 2102 comprises a volume ID 21021, a storage ID 21022, a scale-out availability 21023, an actual storage ID 21024, a volume type 21025, an actual volume ID 21026, and an actual storage ID 21027 for each volume.

The volume ID 21021 is an ID used by the storage management program 2104 to uniquely identify a volume. The volume ID 21021 is the ID acquired with respect to each storage system from the volume management table 1121 held by each storage system.

The storage ID 21022 is the ID of the storage system comprising the volume identified from the volume ID 21021.

The scale-out availability 21023 is an identifier denoting whether or not the storage system identified from the storage ID 21022 is a scale-out-enabled storage system.

The actual storage ID 21024 is the ID of the storage system that actually comprises the volume identified from the volume ID 21021 and the storage ID 21022.

The volume type 21025, the actual volume ID 21026, and the actual storage ID 21027 are information registered in a case where the identifier registered in the scale-out availability 21023 is "ON".

The volume type 21025 is information denoting the type of volume (whether the volume is a virtual volume or an actual volume) that was identified from the IDs registered in the volume ID 21021 and the storage ID 21022.

The actual volume ID 21026 and the actual storage ID 21027 are information registered in a case where the volume type 21025 is "virtual".

The actual volume ID 21026 is the ID of the actual volume that is associated with the virtual volume identified from the volume ID 21021.

The actual storage ID 21027 is the ID of the storage system comprising the actual volume identified from the actual volume ID 21026.

According to the example of FIG. 13, a volume "VOL D3" is the volume of a storage system "Storage A". Furthermore, the storage system "Storage A" is a scale-out storage system, and the volume "VOL D3" actually resides in a storage system "Storage D". In addition, this volume "VOL D3" is a virtual volume, and an actual volume "VOL E3" of a storage system "Storage E" is associated with this virtual volume.

Figure 14:
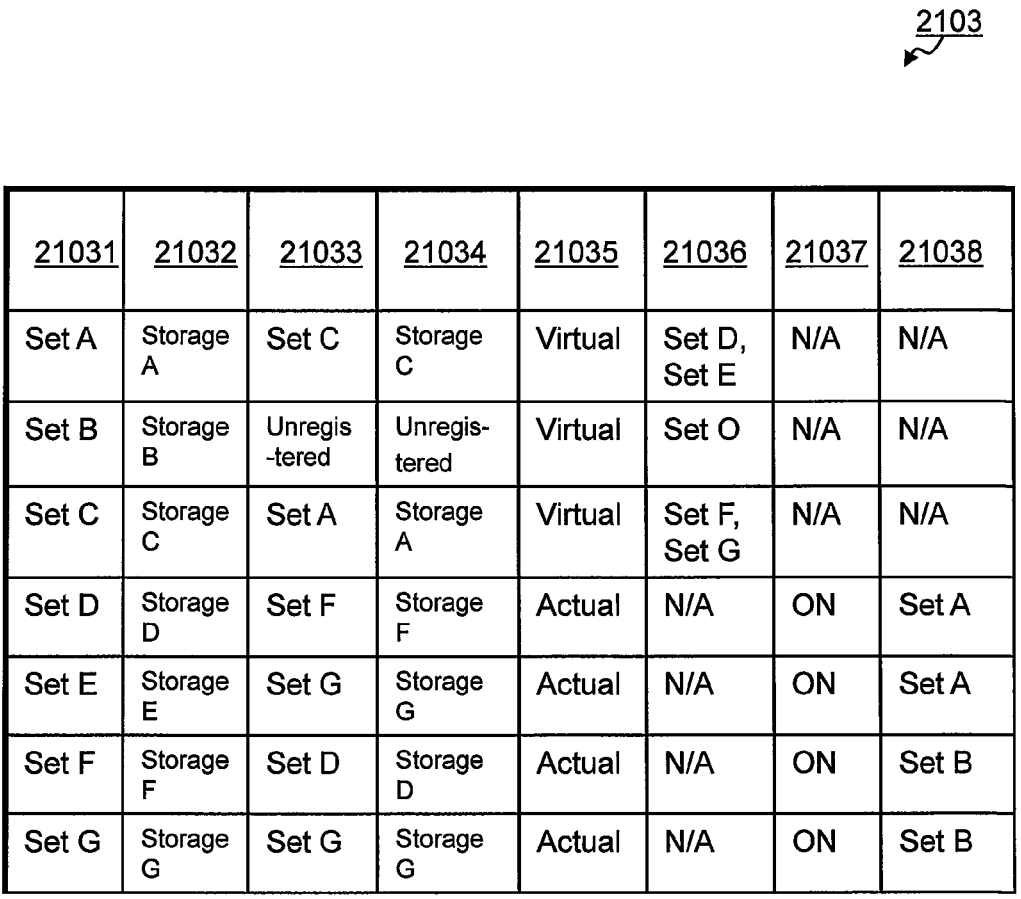
FIG. 14 is a diagram showing an example of the configuration of a volume set consolidation management table of the first example.

FIG. 14 is a diagram showing an example of the configuration of a volume set consolidation management table of the first example.

The volume set consolidation management table 2103 is used by the processor 220 to manage a volume set (the volume set managed by the storage management program 2104) of a storage system. The volume set consolidation management table 2103 is created based on information of the table 1122 of the representative storage system, and information of the table 1123 of each storage system.

The volume set consolidation management table 2103 comprises a volume set ID 21031, a storage ID 21032, a partner volume set ID 21033, a partner storage ID 21034, a volume set type 21035, a configuration volume set ID 21036, a configuration status 21037, and a virtual volume set ID 21038 for each volume set.

The volume set ID 21031 is an ID used by the storage management program 2104 to uniquely identify a volume set.

The storage ID 21032 is the ID of the storage system comprising the volume set identified from the volume set ID 21031.

The partner volume set ID 21033 is the ID of the volume set, which is the remote copy destination of the volume set identified from the volume set ID 21031.

The partner storage ID 21034 is the ID for identifying the storage system comprising the volume set identified from the partner volume set ID 21033. Furthermore, in a case where a remote copy pair has yet to be formed, the partner volume set ID 21033 and the partner storage ID 21034 are both "unregistered".

The volume set type 21035 is information denoting the type of the volume set identified from the volume set ID 21031. In a case where the volume set is a virtual volume set, the volume set type 21035 is "virtual", and in a case where the volume set is an actual volume set, the volume set type 21035 is "actual".

The configuration volume set ID 21036 is the ID of the volume set included in the volume set (that is, the virtual volume set), for which the volume set type 21035 is "virtual".

The configuration status 21037 is an identifier denoting whether or not the volume set, for which the volume set type 21035 is "actual", is the volume set included in the actual volume set. In a case where the volume set is the volume set included in the virtual volume set, the configuration status 21037 is "ON", and in a case where it is not, the configuration status 21037 is "N/A".

The virtual volume set ID 21038 is registered with respect to a volume set for which the volume set type 21035 is "actual" and the configuration status 21037 is "ON". The virtual volume set ID 21038 is the ID of the virtual volume set that comprises the volume set identified from the volume set ID 21041.

According to FIG. 14, a volume set "Set A" resides in a storage system "Storage A". This volume set is associated with a volume set "Set C" of a storage system "Storage C".

However, the volume set "Set A" is a virtual volume set. Actually, the volume set "Set A" comprises a volume set "Set D" (the volume set that resides in a storage system "Storage D") and a volume set "Set E" (the volume set that resides in a storage system "Storage E"). The volume set "Set D" is associated with a volume set "Set F" (the volume set that resides in a storage system "Storage F"). Furthermore, the volume set "Set E" is associated with a volume set "Set G" (the volume set that resides in a storage system "Storage G").

Figure 15:
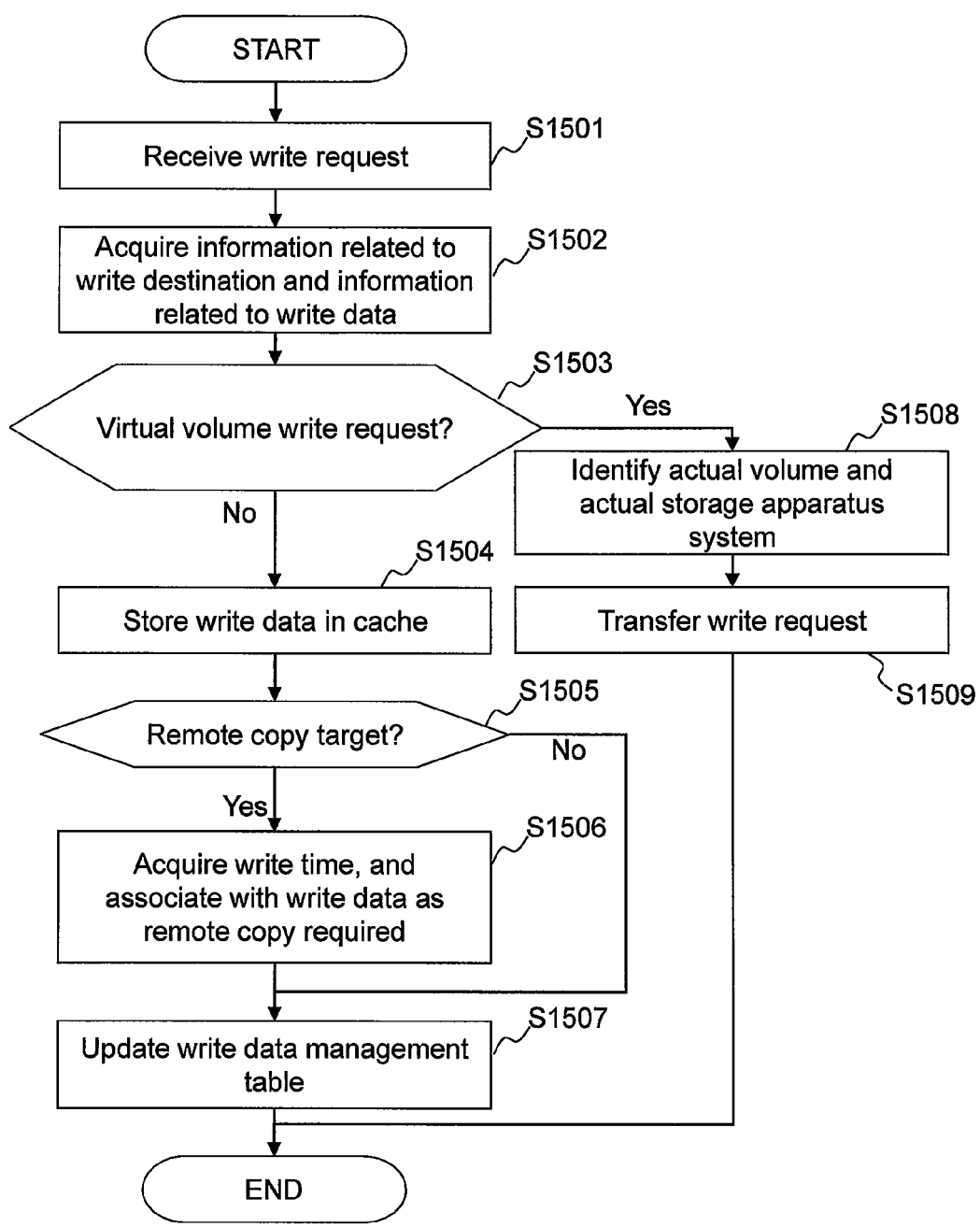
FIG. 15 is a flowchart of a write request process of the first example.

FIG. 15 is a flowchart of a write request process.

Specifically, this drawing shows the flow of a write request process in accordance with the control program 1126 (refer to FIG. 2) in a case where the primary storage system 10*a* has received a write request (a write request with respect to the copy source volume of a remote copy) from the primary host computer 30*a*.

The control program 1126, upon receiving the write request from the primary host computer 30*a* (S1501), analyzes this write request. In accordance with this, the control program 1126 acquires an ID of the write destination volume, a write address, a write data length, write time information (information denoting the write time) and write data (S1502).

The control program 1126 performs the following processing in S1503:

(*) acquires the volume type 11212 of the write destination volume by using the wrote destination volume ID to reference the volume management table 1121; and (*) determines from the identified volume type 11212 whether or not the write destination volume is a virtual volume.

In a case where the volume type 11212 of the write destination volume is "virtual" (S1503: Yes), the control program 1126 identifies the actual storage ID 11213 and the actual volume ID 11214 that are associated with the write destination virtual volume from the volume management table 1121 (that is, identifies the actual volume associated with the write destination virtual volume, and the actual storage comprising this actual volume) (S1508).

In addition, the control program 1126 transfers the write request that specifies the actual volume identified in S1508 to the actual storage system identified in S1508, and ends the write-request-receive processing in the relevant storage system (S1509). Furthermore, the write request is processed in the transfer destination storage system the same as in the flow of processing of FIG. 15. The write address (the address denoting the write destination storage area), which is specified in the transferred write request, specifies the address of the actual volume corresponding to the write address of the virtual volume acquired in S1502. The virtual volume address and the actual volume address are managed in the transfer source storage system.

In a case where the volume type of the write destination volume is not "virtual" (S1503: No), the control program 1126 stores the write data acquired in S1502 in the cache memory 113 (S1504).

The control program 1126 checks whether a valid pair ID 11216 is registered in the write destination volume by using the write destination volume ID to reference the volume management table 1121. That is, the control program 1126 checks whether or not the write destination volume is the remote copy target (S1505).

In a case where the write destination volume is the remote copy target (S1505: Yes), the control program 1126 associates the write time information acquired in S1502 to the write data (S1506). The write time information is used by the control program 1126 to guarantee the write sequence when writing the write data to the remote copy destination volume.

The control program 1126 registers the information acquired in S1502 (the write destination volume ID, the write address, the write data length, and the write time information), the storage destination address (the write data pointer) of the cache memory that stored the write data in step S1504, and the sequential number denoting the update sequence for the start of the remote copy in the write data management table 1125 as a new entry (S1507). Furthermore, in a case where the write data has been associated as being in need of a remote copy in S1506, the control program 1126 registers the remote copy requirement 11257 of the write data management table 1125 as remote copy required.

In the above-described process, the control program 1126 is able to asynchronously manage a write request from the host computer 30*a* and store write data from the cache memory in a volume by using the write data management table 1125 to manage the write data, and storing the write data in the volume from the cache memory while referencing this table 1125.

Figure 16:
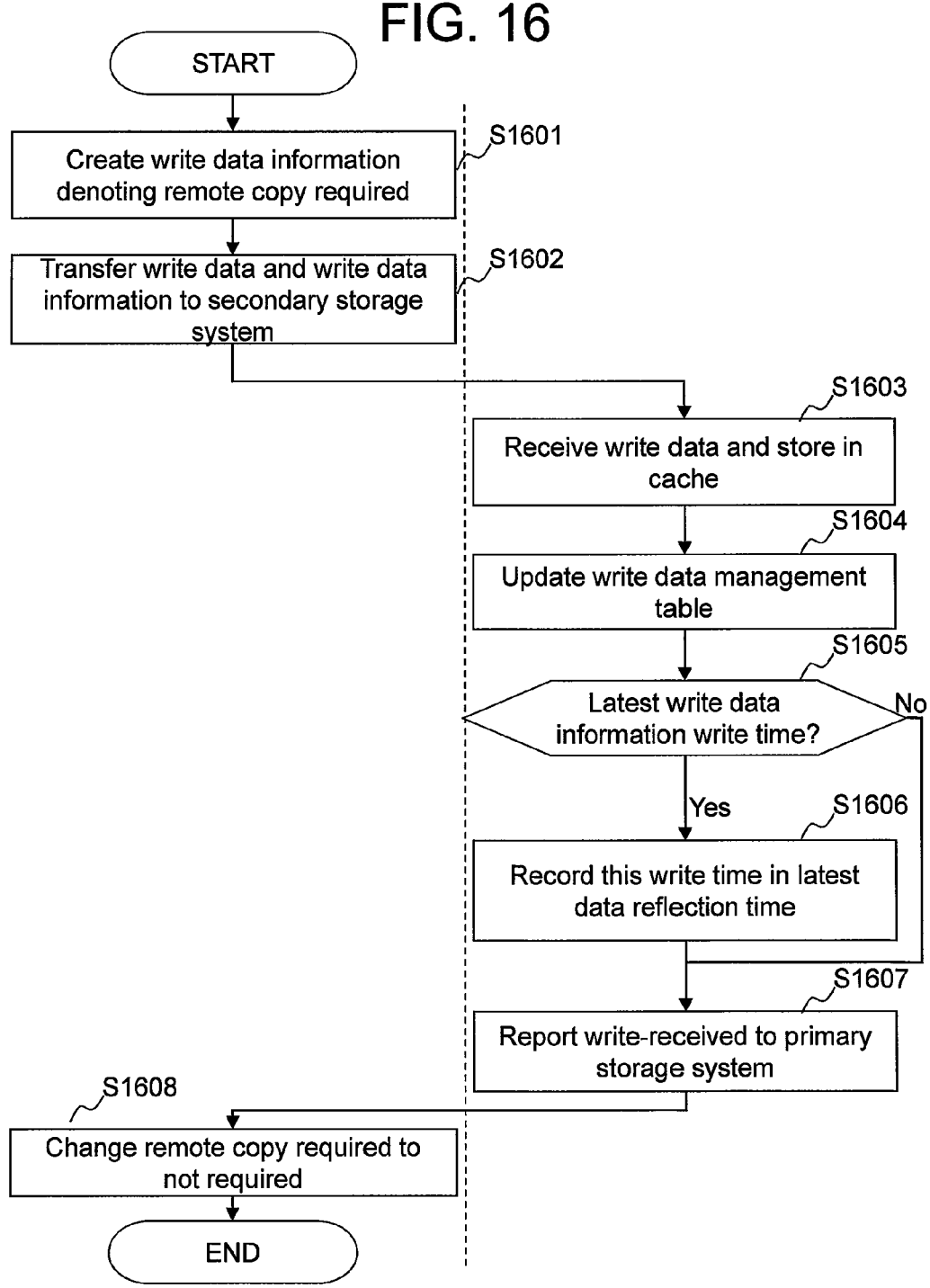
FIG. 16 is a flowchart of a write date transfer process of the first example.

FIG. 16 is a flowchart of a write data transfer process of the first example.

The process for transferring write data from the primary storage system 10*a* to the secondary storage system 10*b* is carried out here by the control program of the primary storage system 10*a* (hereinafter the primary control program) 1126. Furthermore, the processing to the left of the dotted line is primary storage system 10*a* processing, and the processing to the right of the dotted line is secondary storage system 10*b* processing.

First, the primary control program 1126 identifies the entry (row) in the write data management table 1125 in which the remote copy requirement 11257 comprises "required". Next, the primary control program 1126 creates write data information based on the information of the identified entry, the write data management table 1125, the volume set management table 1123, and the copy pair management table 1124 (S1601).

The write data information comprises the following information:
(*) the write destination address 11262, the write data length 11263, and the write time 11266 of the above-mentioned identified row in the write data management table 1125; and
(*) the partner storage ID 11244, the partner volume ID 11245, and the partner volume set ID 21033 identified from the volume management table 1121, the copy pair management table 1124, and the volume set management table 2103.

For example, in a case where the volume ID 11251 registered in the write data management table 1125 is "VOL D1", the entry of the volume ID "VOL D1" is retrieved from the volume management table 1121. Then, using the pair ID 11216 of this entry, the information related to the pair configuration to which the "VOL D1" belongs (the partner storage ID 11244, the partner volume ID 11245, and the partner volume set ID 21033) is identified from the copy pair management table 1124 and the volume set management table 1123.

Next, the primary control program 1126 transfers the write data identified in S1601 and the created write data information to the secondary storage system 10*b* (S1602).

The control program of the secondary storage system 10*b* (hereinafter the secondary control program) 1126, upon receiving the write data and the write data information from the primary storage system 10*a*, stores this information in the cache memory 113 (S1603). The secondary control program 1126, based on the received write data information, registers a new entry in the write data management table 1125 of the secondary storage system 10*b* (S1604). The secondary control program 1126 checks whether or not a write time is included in the received write data information (S1605). In a case where the write time is the latest write time (S1605: Yes), the secondary control program 1126 registers the write time as the latest data reflection time 11236 in the volume set management table 1123 of the secondary storage system 10*b* (S1606). Furthermore, in a case where the write time is not the latest write time (S1605: No), the secondary control program 1126 performs the processing of S1607 and subsequent steps.

The secondary control program 1126 reports to the primary storage system 10*a* that the write data receive is complete (S1607).

The primary control program 1126, which received the write data receive complete report, updates the remote copy requirement 11257 of the write data corresponding to the complete report to "not required" in the write data management table 1125, and ends the processing (S1608).

Furthermore, in a case where the primary control program 1126 has checked that the write data has been written to the volume (the remote copy destination volume) of the secondary storage system 10*b*, the primary control program 1126 may delete the entry corresponding to the remote-copied write data from the write data management table 1125.

Figure 17:
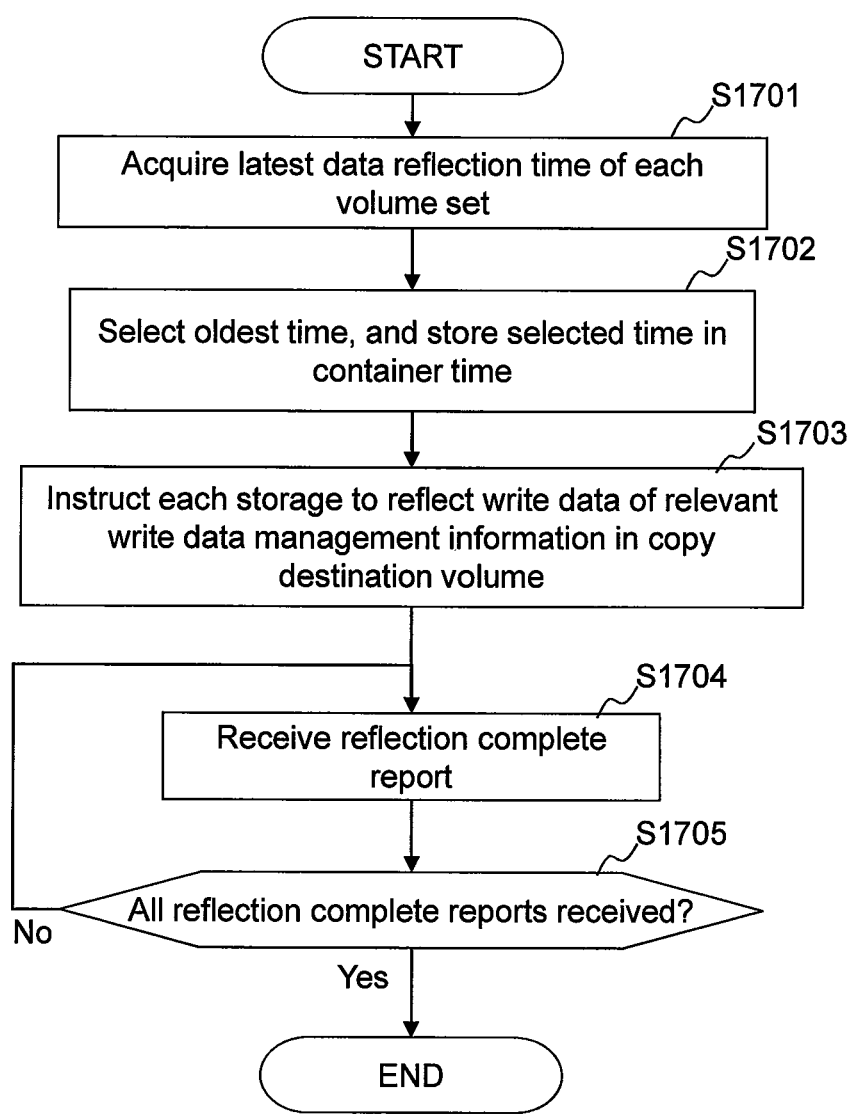
FIG. 17 is a flowchart of a write data reflection process performed by a representative storage system of the first example.
Figure 18:
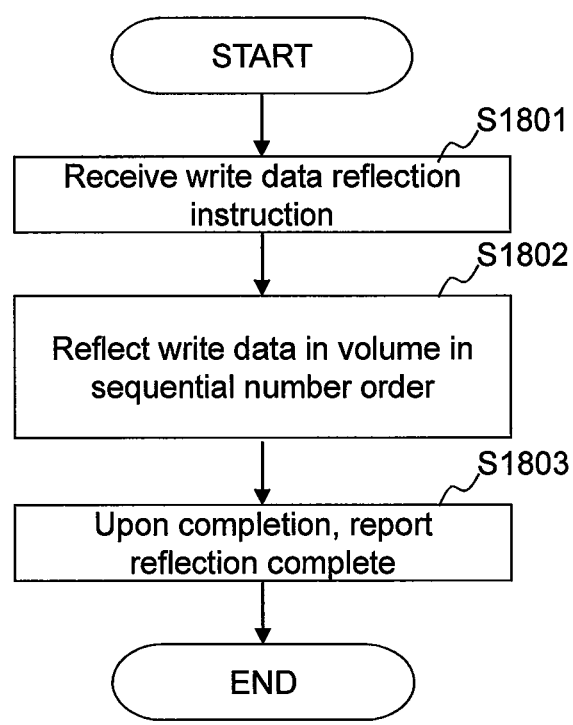
FIG. 18 is a flowchart of a write data reflection process performed by a non-representative storage system of the first example.

FIGS. 17 and 18 are flowcharts showing examples of the write data reflection process by the control program (for example, the secondary control program) 1126 in the first example. Specifically, FIG. 17 is a flowchart of a write data reflection process performed by a representative storage system (for example, a representative secondary storage system). FIG. 18 is a flowchart of a write data reflection process performed by a non-representative storage system (for example, a non-representative secondary storage system).

A representative secondary storage system of the multiple secondary storage systems 10*b* controls the start of a reflection process of another secondary storage system. This makes it possible to guarantee that write sequence in the copy source volume set and the reflection sequence in the copy destination volume set are the same even when the multiple copy destination volumes comprising the copy destination volume set reside in multiple secondary storage systems. Furthermore, a storage system that is not a virtual storage system may comprise a volume set included in a virtual volume set, and in this case, this one storage system may serve both as a representative storage system and as a non-representative storage system.

The control program of the representative storage system (hereinafter, the representative control program) 1126 identifies the ID of the storage system comprising the volume set, which is the management target, from the volume set representative management table 1122. The representative control program 1126 also identifies the latest data reflection time 11236 of the management target volume set from the volume set management table 1123, which all of the non-representative storage systems have (S1701).

The representative control program 1126 selects the oldest time 11236 from among all of the latest data reflection times 11236 identified in S1701, and registers the selected time 11236 as the container time 11222 of the volume set representative management table 1122 (S1702). In addition, the representative control program 1126 instructs the respective non-representative storage systems (the non-representative storage system comprising the volume set that is the management target) to reflect write data denoting a time that is older than this container time 11222 in the copy destination volume, and waits for a report related to the copy destination volume reflection processing from each non-representative storage system (S1703).

The representative control program 1126 receives a reflection processing-related report from any of the non-representative storage systems (S1704), and checks whether a write data reflection complete has been received from all of the management target non-representative storage systems (S1705). In a case where a reflection complete has been received from all of the non-representative storage systems (S1705: Yes), the representative control program 1126 ends the processing. In a case where a reflection complete has not been received from at least one of the non-representative storage systems (S1705: No), processing returns to S1704, and the representative control program 1126 receives the reflection processing-related report from the non-representative storage system.

Next, a write data reflection process in a non-representative storage system will be explained using FIG. 18.

The control program (hereinafter the non-representative control program) 1126 of a non-representative storage system (for example, the secondary storage system 10b) receives a write data reflection instruction (refer to S1703) from the representative storage system (S1801). The non-representative control program 1126 reflects the write data until the instructed time in the copy destination volume in the sequence of the sequential number 11255 from the write data management table 1125 (S1802). When the write data reflection is complete, the non-representative control program 1126 issues a write data complete report to the representative storage system (S1803).

Figure 19:
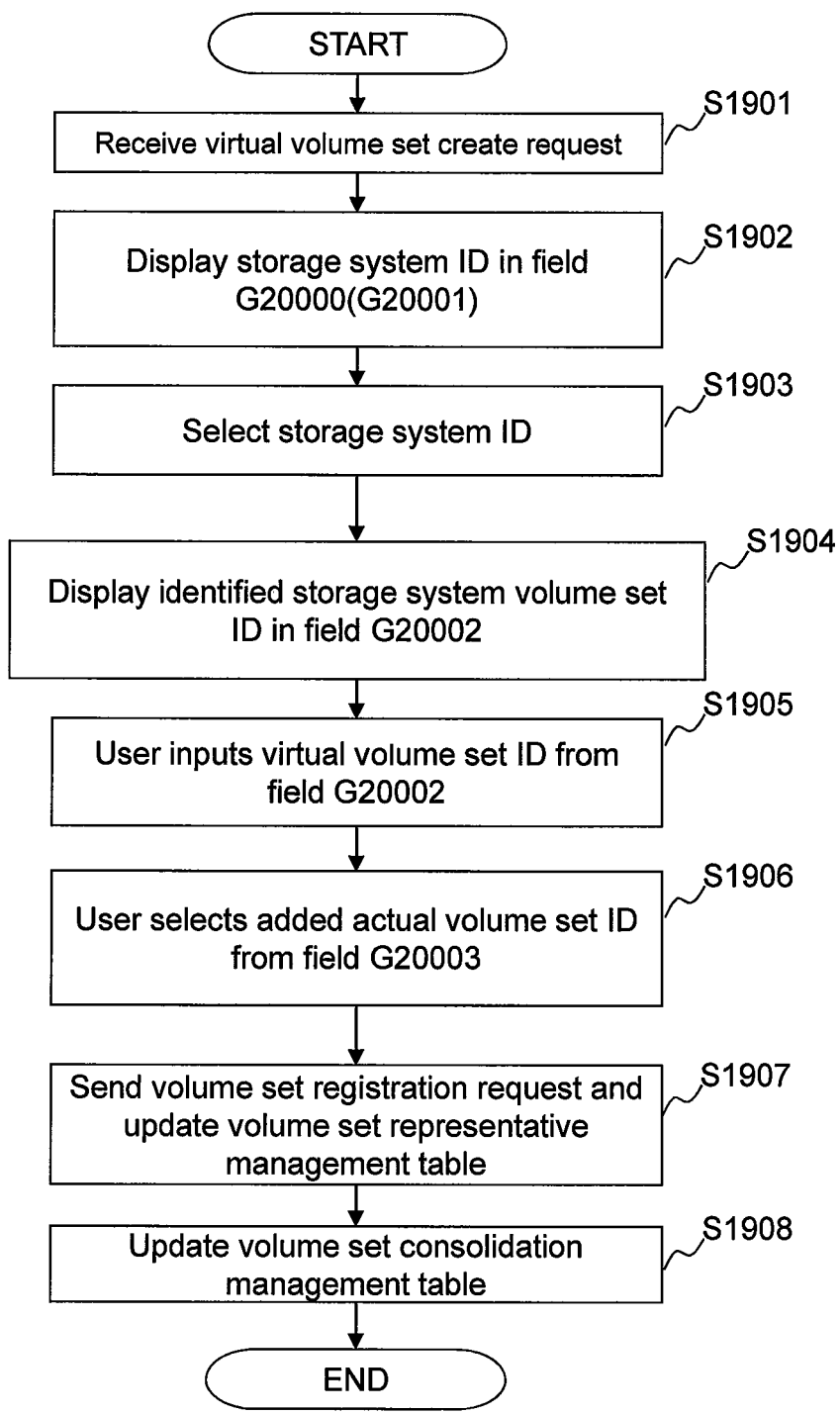
FIG. 19 is a flowchart of a virtual volume set creation process of the first example.
Figure 20:
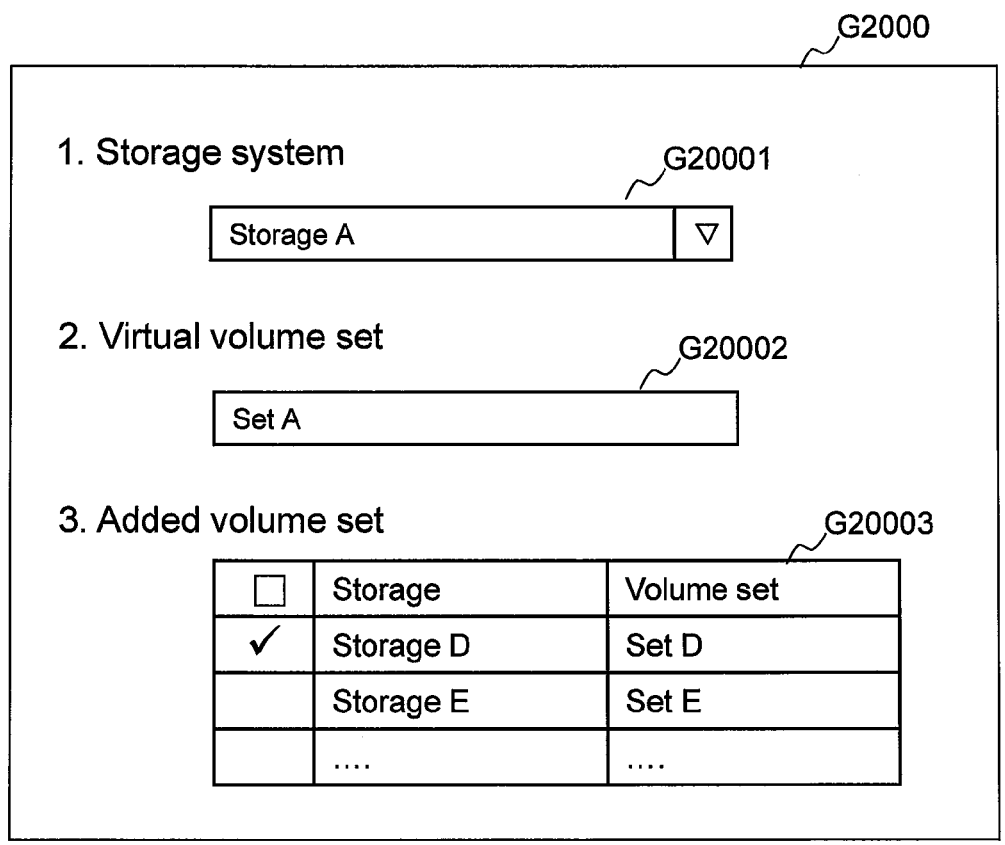
FIG. 20 is a diagram showing a virtual volume creation screen provided by a storage management program of the first example.

FIG. 19 is a flowchart of a virtual volume set creation process of the first example. FIG. 20 is a diagram showing a virtual volume set creation screen provided by the storage control program of the first example. The virtual volume set creation process will be explained hereinbelow using FIGS. 19 and 20. The virtual volume set and the actual volume set that comprise same are determined here.

The storage management program 2104 receives a virtual volume set create request from the user via a user interface (refer to FIG. 20) provided by the storage management program 2104 (S1901). The storage management program 2104 displays the virtual volume set creation screen G2000 on a display device (not shown in the drawing) of the management computer 20 (S1902). At this time, the storage management program 2104 displays in the storage system field G20001 all of the storage IDs 21011 registered in the storage management table 2101 as storage system selection candidates. According to the example of FIG. 12, the "Storage A", the "Storage B", and the "Storage C" are displayed as the selection candidates in the storage system field G20001.

Next, the user uses the input device (not shown in the drawing) of the management computer 20 to select, from among the one or more storage IDs displayed in the storage system field G20001, the ID of the storage system in which he wishes to create a virtual volume set (S1903).

The storage management program 2104 identifies the ID 21011 that matches the storage ID that the user selected in S1903 from the storage management table 2101.

Next, the storage management program 2104 performs the following processing in S1904:
(*) identifies from the volume set consolidation management table 2103 the same storage ID 21032 as the identified storage ID 21011; and
(*) displays in the added volume set field G20003 as a volume set selection candidate the ID of the actual volume set, which corresponds to the identified storage ID 21032, has "unregistered" as the partner volume set ID 21033, and, in addition, does not comprise a virtual volume set.

The user inputs the ID of the newly created virtual volume set to the virtual volume set field G20002 (S1905), and selects the volume set registered in the virtual volume set from the added volume set field G20003 (S1906).

The storage management program 2104 references the storage management table 2101, identifies the representative storage system of the storage system comprising the storage system selected by the user in S1903, and sends a volume set registration request to this representative storage system. The representative storage system that receives this request registers an entry related to the newly created volume set in the volume set representative management table 1122 (S1907). The storage management program 2104 at this point registers the ID of the virtual volume set and the ID of the volume set comprising same.

Lastly, the storage management program 2104 registers an entry related to the newly created virtual volume set in the volume set consolidation management table 21023. Specifically, the storage management program 2104 changes the configuration status 21037 of the volume set included in the virtual volume set to "ON", and, in addition, registers the ID of the created virtual volume set as the virtual volume set ID 21038 (S1908).

Figure 21:
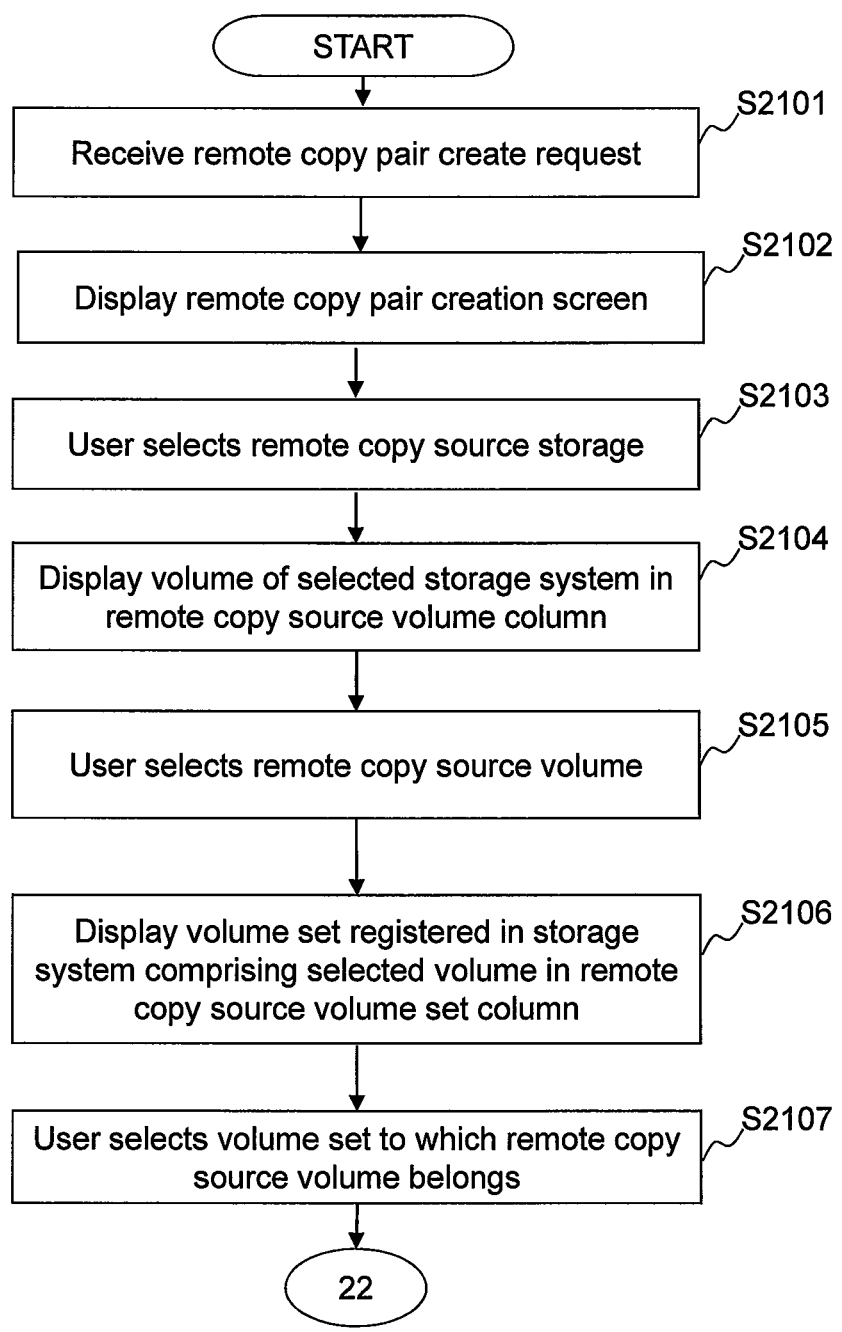
FIG. 21 is a flowchart showing one portion of a remote copy pair creation process of the first example.
Figure 22:
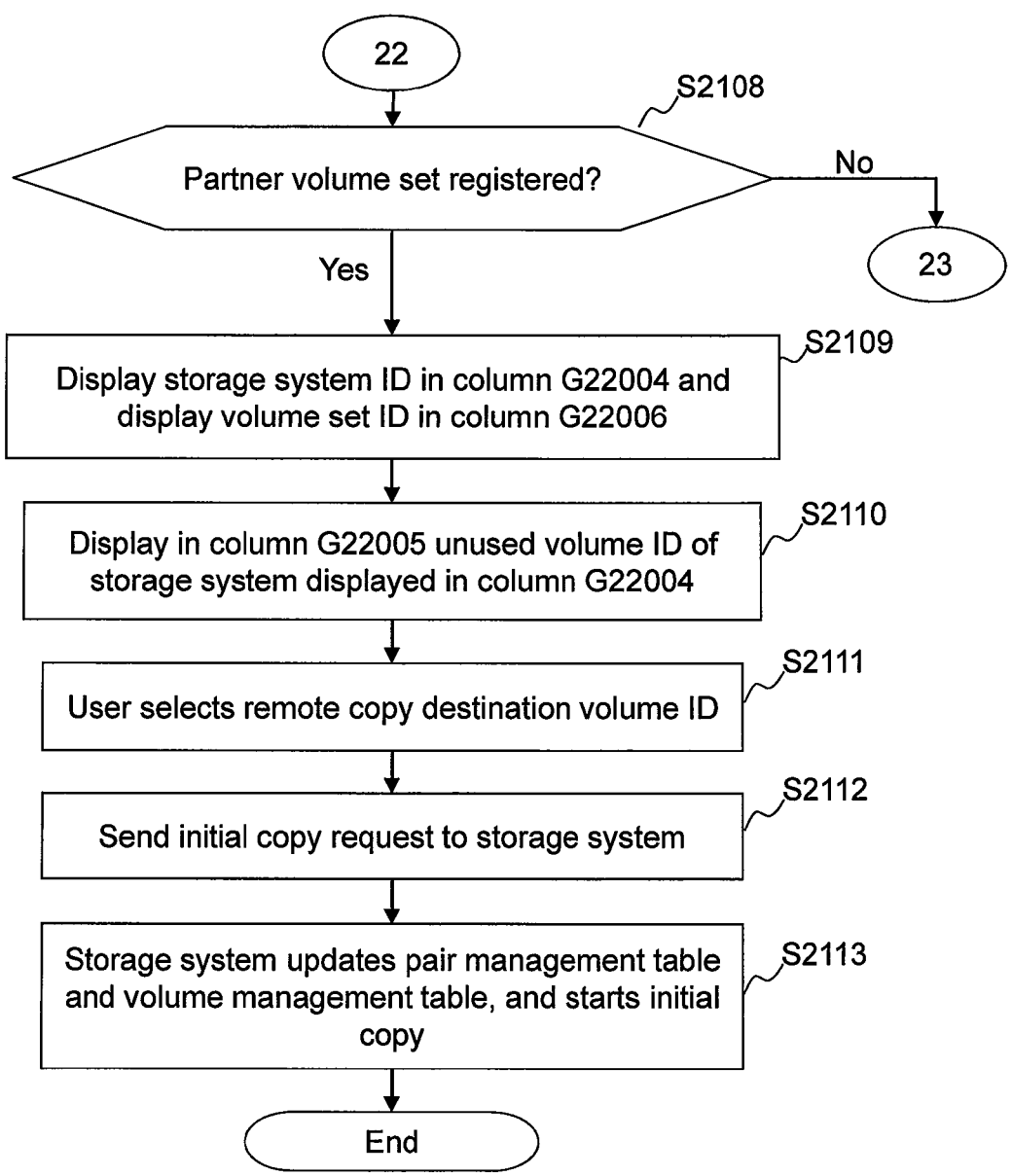
FIG. 22 is a flowchart showing another portion of the remote copy pair creation process of the first example.
Figure 23:
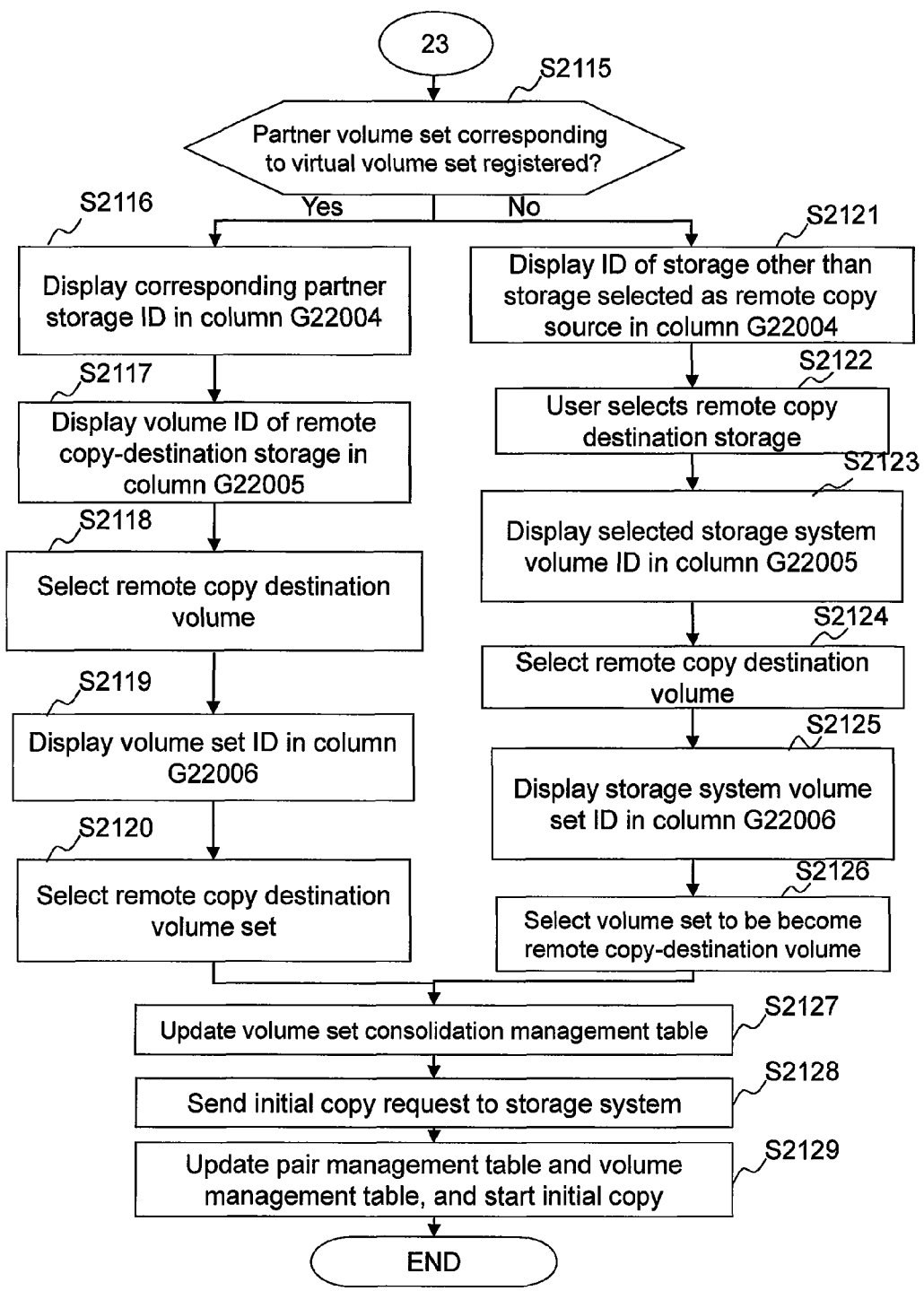
FIG. 23 is a flowchart showing the remainder of the remote copy pair creation process sequence of the first example.
Figure 24:
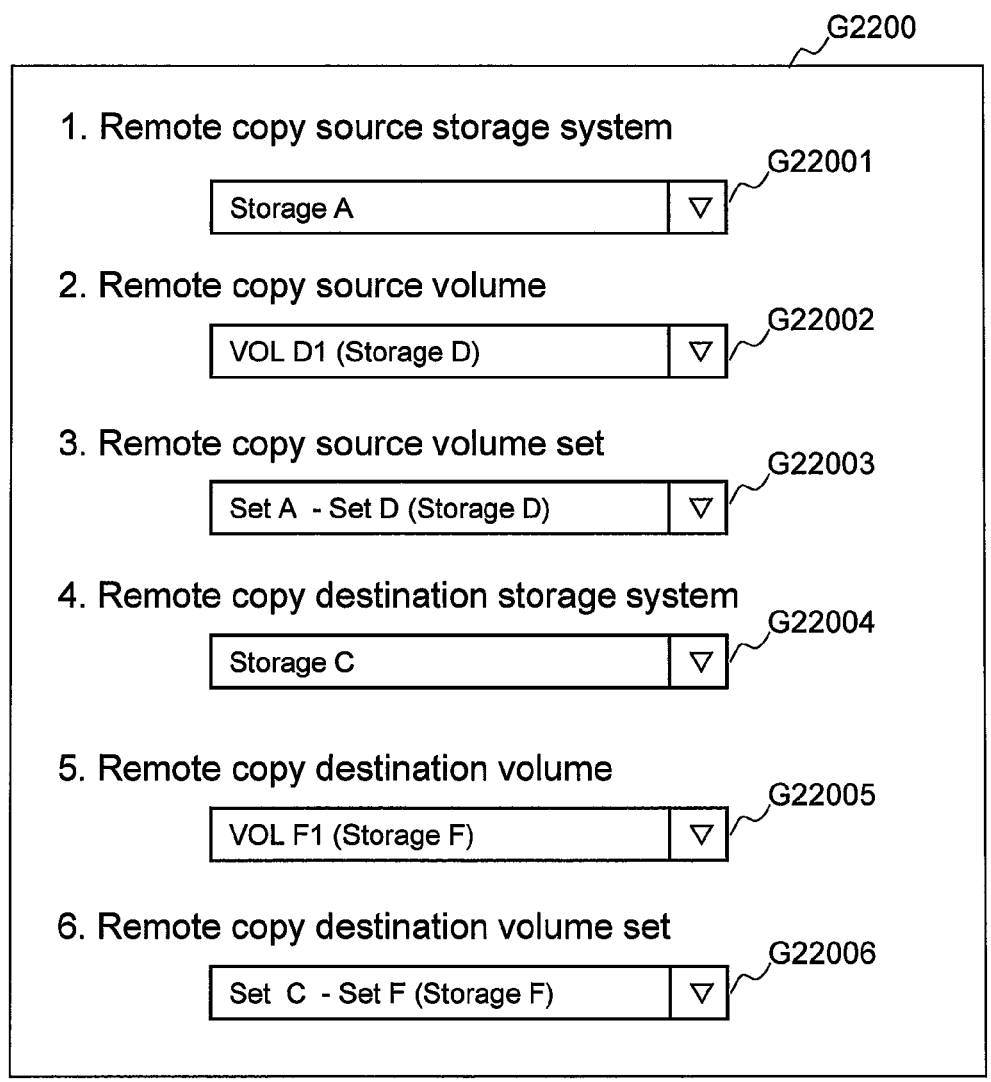
FIG. 24 is a diagram showing a remote copy pair creation screen provided by the storage management program of the first example.

FIGS. 21 to 23 are flowcharts showing an example of a remote copy pair creation process in the first example. Furthermore, FIG. 24 is a diagram showing an example of a remote copy screen in the first example. The remote copy pair creation process will be explained by referring to the FIGS. 21 to 24.

The storage management program 2104 receives a remote copy pair create request from the user via a user interface provided by the storage management program 2104 (S2101). The storage management program 2104 displays a remote copy pair creation screen G2200 in response to this request (S2102). The storage management program 2104 displays all of the storage IDs 21011 registered in the storage management table 2101 in a remote copy source storage system field G22001 at this time.

The user selects the storage system he wishes to use as the remote copy source from among the storage systems displayed in the remote copy source storage system field G22001 (S2103).

The storage management program 2104, based on the volume consolidation management table 2103, lists up the volumes, which are in the storage system that the user selected in S2103, and, in addition, which have "actual" as the volume type, and displays the IDs of all the volumes that have been listed up (the volume selection candidates) in a remote copy source volume field G22002 (S2104).

The user selects the volume he wishes to use as the remote copy source volume from among the volumes displayed in the remote copy source volume field G22002 (S2105).

The storage management program 2104, based on the volume set consolidation management table 2103, lists up the volume sets in the storage system comprising the volume that the user selected in S2105. Then, the storage management program 2104 displays the IDs of the volume sets that have been listed up (the volume set selection candidates) in a remote copy source volume set field G22003 (S2106).

The user selects the volume set comprising the volume selected in S2105 from among the volume sets displayed in the remote copy source volume set field G22003 (S2107).

For example, in a case where the user has selected the storage system "Storage A" in S2103, in S2104, the storage management program 2104 displays all the volume IDs having the volume type "actual" from among the volumes of the storage system "Storage A" in the remote copy source volume field G22002.

When the user selects the volume "VOL D1", the storage management program 2104 displays the volume set "Set D" of the storage system "Storage D" in the remote copy source volume set field G22003. Furthermore, according to the example of FIG. 24, a virtual volume set ID may be displayed to clearly show which virtual volume set comprises the volume set "Set D".

Next, as shown in FIG. 22, the storage management program 2104 references the volume set consolidation management table 2103 to check whether a partner volume set (a copy destination volume set) corresponding to the volume set selected in S2107 has been registered (S2108).

For example, according to the example of FIG. 14, it is clear that when the user selected the volume set "Set D" in S2107, the partner volume set "Set F" was registered.

In a case where the partner volume set is registered (S2108: Yes), the storage management program 2104 displays the ID of the partner storage in a remote copy destination storage system field G22004, and, in addition, displays the ID of the partner volume set in a remote copy destination volume set field G22006 (S2109).

Furthermore, in this example, the ID displayed in the remote copy destination storage system field G22004 may be the storage system comprising the virtual volume set, that is, the ID of the virtual storage system. It can be supposed that this ID is the storage ID 21032 in the entry comprising the volume set ID 21031 corresponding to the virtual volume set ID 21038 of the volume set consolidation management table 2103.

Next, the storage management program 2104 displays an unused volume from among the volumes of the storage system comprising the volume set displayed in S2109 in a remote copy destination volume field G22005 (S2110).

The user selects the volume he wishes to use as the remote copy destination volume from among the volumes displayed in the remote copy destination volume field G22002 in S2110 (S2111).

The storage management program 2104 sends an initial copy start request to the storage system comprising the remote copy source volume, and to the storage system comprising the remote copy destination volume (S2112).

Lastly, the storage system, which receives the initial copy start request, performs the following processing in S2113:
(*) adds an entry related to the new remote copy pair to the remote copy pair management table 1124;
(*) updates the volume ID 11233 of the relevant volume set, the partner storage ID 11234, and the partner volume set ID 11235 of the volume set management table 1123;
(*) updates the pair ID 11216 of the relevant volume of the volume management table 1121; and
(*) starts the initial copy subsequent to this processing.

In a case where it was determined in S2108 that there is no partner volume set (S2108: No), the processing shown in FIG. 23 is performed.

Specifically, the storage management program 2104 identifies the virtual volume set comprising the volume set that the user selected in S2106, and checks whether or not a partner volume set corresponding to this virtual volume set has been registered (S2115).

In a case where the partner volume set is registered (S2115: Yes), the storage management program 2104 executes the processing of S2116 to S2120. In a case where the partner volume set is not registered (S2115: No), the storage management program 2104 executes the processing of S2121 to S2126.

The storage management program 2104 identifies the ID 21034 of the partner storage system comprising the virtual volume set identified in S2115 from the volume set consolidation management table 2103. Then, the storage management program 2104 displays this ID in the remote copy destination storage field G22004 (S2116).

Next, the storage management program. 2115, based on the volume consolidation management table 2102, displays the ID of the volume of the partner storage identified in S2116 (the remote copy destination volume selection candidate) in the remote copy destination volume field G22005 (S2117).

The user selects the volume he wishes to use as the remote copy destination volume from among the volumes displayed in the remote copy destination volume field G22002 (S2118).

The storage management program 2104 identifies the ID 21036 of the volume set comprising the virtual volume set identified in S2115 from the volume set consolidation management table 2103.

The storage management program 2104 displays the ID of the volume set, which is in the storage system comprising the volume that the user selected in S2118, and, in addition, has yet to become a pair (the remote copy destination volume set selection candidate) of the identified volume set ID 21036 in the remote copy destination volume set field G22006 (S2119).

The user selects the volume set he wishes to use as the remote copy destination volume from among the volume sets displayed in the remote copy destination volume set field G22006 (S2120).

In a case where the partner volume set is not set in S2115 (S2115: No), the processing hereinbelow is executed.

The storage management program 2104 displays the ID of a storage system other than the storage systems that the user selected in S2103 (the remote copy destination storage system selection candidate) from the storage management table

2101 in the remote copy destination storage system field G22004 (S2121). According to the example of FIG. 12, in S2104, when the remote copy source storage system "Storage A" has been selected, the "Storage B" and the "Storage C" are displayed as the storage systems other than the storage system "Storage A" in the remote copy destination storage system field G2200.

The user selects the storage system he wishes to use as the remote copy source from among the storage systems displayed in the remote copy source storage system field G22001 (S2122).

The storage management program 2104, based on the volume consolidation management table 2103, lists up the IDs of the volumes, which belong to the storage system selected by the user in S2122, and, in addition, have "actual" as the volume type. The storage management program 204 displays the IDs of the volumes that have been listed up (the volume selection candidates) in the remote copy destination volume field G22005 (S2123).

The user selects the volume that he wishes to use as the remote copy source volume from among the volumes displayed in the remote copy destination volume field G22005 (S2124).

The storage management program 2104, based on the volume set consolidation management table 2103, lists up the volume sets in the storage system comprising the volume selected by the user in S2105. Then, the storage management program 2104 displays the IDs of the volume sets that that have not become pairs yet (the volume set selection candidates) from among the listed volume sets in the remote copy destination volume set field G22006 (S2125).

The user selects the volume set he wishes to use as the remote copy destination volume set from among the volume sets displayed in the remote copy destination volume set field G22006 (S2126).

Subsequent to the completion of the processing of either S2120 or S2126, the following processing is executed.

The storage management program 2104 updates the volume set consolidation management table 2103 based on the setting contents of the screen G2200 (S2127). Specifically, the storage management program 2104 updates the partner volume set ID 21033 and the partner storage ID 21034 of the relevant volume set in a case where a partner volume set and a partner storage corresponding to each volume set have been newly determined.

The storage management program 2104 sends an initial copy start request to the storage system comprising the remote copy source volume, and to the storage system comprising the remote copy destination volume (S2128).

Lastly, the storage system that received the initial copy start request in S2119:
(*) adds an entry related to the new remote copy pair to the remote copy pair management table 1124;
(*) updates the volume ID 11233 of the relevant volume set, the partner storage ID 11234, and the partner volume set ID 11235 of the volume set management table 1123;
(*) updates the pair ID 11216 of the relevant volume of the volume management table 1121; and
(*) starts the initial copy subsequent to this processing.

Furthermore, although omitted from the explanation, in S2119 and the like, in a case where the relevant volume is not registered, an error notification may be issued and the processing ended.

In the processes described hereinabove, when the remote copy destination storage system selection candidates are listed up (S2121), for example, a storage system included in the same virtual storage system as the remote copy source storage system will not be listed up as a remote copy destination storage system selection candidate even when the storage system differs from the remote copy source storage system. For this reason, it is possible to prevent the creation of a remote copy pair between storage systems included in the same virtual storage system. That is, the virtual storage system can be managed as a single storage system.

Furthermore, in the remote copy pair creation process in this example, when the remote copy source volume selection candidates and the remote copy destination volume selection candidates are listed up (S2105, S2110, S2117, S2123), only those volumes with the volume type "actual" are listed up. For this reason, it is possible to restrict the remote copy pair components to actual volumes even when a virtual volume that is associated with an actual volume exists, and the virtual volume is being provided to the host computer.

Furthermore, both a virtual volume and an actual volume may be displayed as a remote copy source volume selection candidate and/or a remote copy destination volume selection candidate. In a case where a virtual volume has been selected as the remote copy source volume and/or the remote copy destination volume, the volume consolidation management table 2102 can be used to identify the actual volume that corresponds to the virtual volume. That is, in a case where the remote copy source volume and/or the remote copy destination volume is/are a virtual volume, the associated actual volume substantially becomes the remote copy source volume and/or the remote copy destination volume.

Furthermore, in the processes described hereinabove, the premise is that an actual volume set is included in a virtual volume set beforehand, and when creating a remote copy pair, the user must be aware of the actual volume sets that comprise the virtual volume set.

However, for example, only the virtual volume set itself may be specified without specifying the actual volume sets that are included in this virtual volume set. In accordance with this, the storage management program 2104 must perform the following checks with respect to the storage system comprising the remote copy source volume and/or the storage system comprising the remote copy destination volume:
(A) check whether or not an actual volume set comprising the specified volume is included in the specified virtual volume; and
(B) check whether or not the volume set comprising the remote copy source volume and the volume set comprising the remote copy destination volume are associated with one another.

The storage management program 2104, in a case where the check result for at least one of the above-mentioned (A) and (B) is negative, is able to create a new volume set, include this volume set in the virtual volume set, and create a new pair (volume set pair). By doing so, the user need not be made aware of the actual volume sets that are included in the virtual volume set when a remote copy pair is created.

Figure 25:
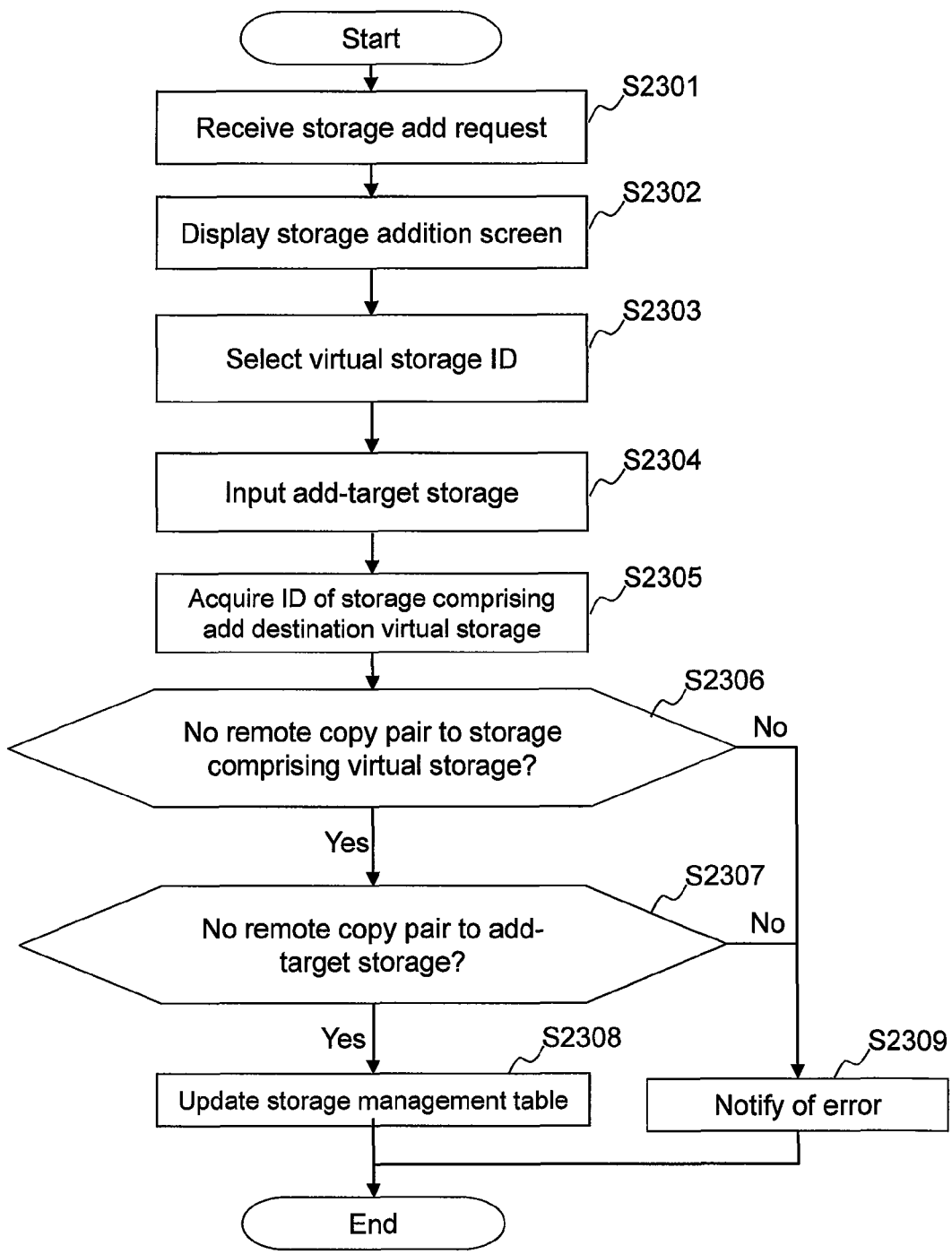
FIG. 25 is a flowchart of a storage addition process of the first example.
Figure 26:
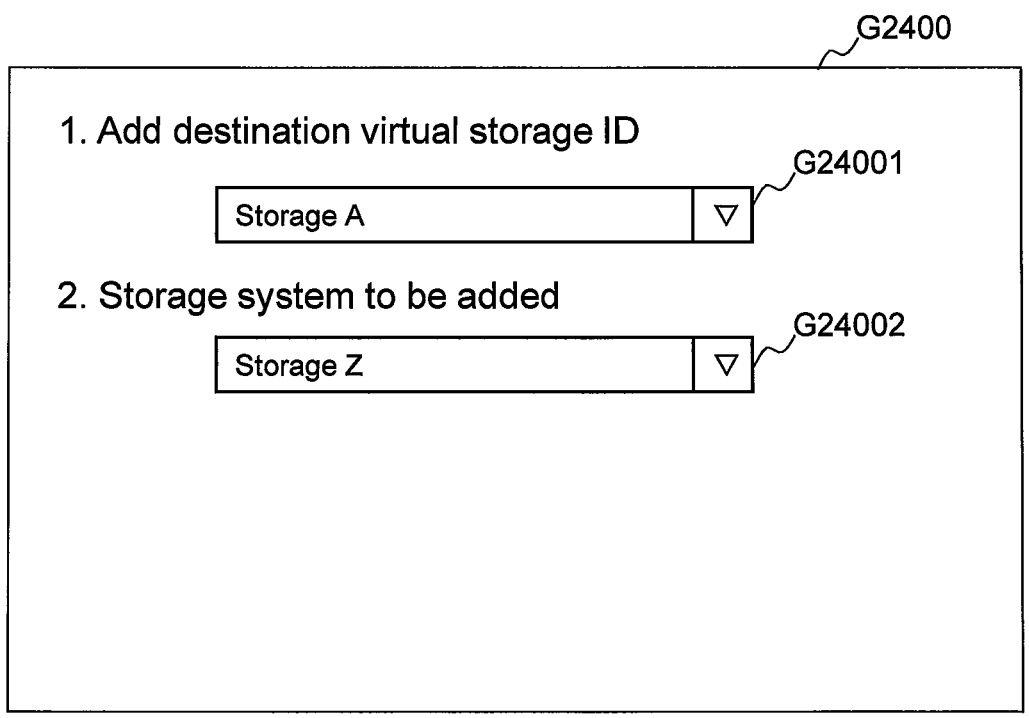
FIG. 26 is a diagram showing a storage addition screen of the first example.

FIG. 25 is a flowchart of a storage addition process of the first example. Furthermore, FIG. 26 is a diagram showing a storage addition screen of the first example. The storage addition process will be explained by referring to FIGS. 25 and 26.

The storage management program 2104 receives a storage addition request from the user via a user interface provided by the storage management program 2104 (S2301). Then, the storage management program 2104 displays a storage addition screen G2400 in response to this request (S2302).

The storage management program 2104 displays the IDs of storage systems having a scale-out availability of "ON" (virtual storage selection candidates) based on the storage management table 2101 in an add destination virtual storage ID field G24001.

In addition, the storage management program. 2104, based on the storage management table 2101, displays the IDs of storage systems for which the scale-out availability is "ON" and the virtual storage system comprises only one storage system in a storage system to be added field G24002.

Next, the user selects the ID of the virtual storage system to which he wishes to add a storage system from among the storage systems displayed in the add destination virtual storage ID field G24001 (S2303). Furthermore, the user may not only select a storage ID from the add destination virtual storage ID field G24001, but may also directly input a storage ID into the add destination virtual storage ID field G24001 to handle a case in which a new virtual storage is created.

In addition, the user selects the ID of the storage system he wishes to add to the virtual storage system that the user selected in S2303 from the storage systems displayed in the storage system to be added field G24002 (S2304).

The storage management program 2104 identifies ID 21013 of the storage systems that comprise the virtual storage system selected by the user in S2303 from the storage management table 2101 (S2305).

The storage management program 2104, based on the copy pair management table 1124 of the storage system selected in S2304, checks for the presence or absence of a remote copy pair from this storage system to the respective storage systems identified in S2305 (S2306). That is, the storage management program 2104 checks whether or not the IDs of the storage systems identified in S2305 are in the copy pair management table 1124 of the storage systems selected in S2304 as partner storage IDs.

In a case where a remote copy pair does not exist (S2306: Yes), the storage management program 2104, based on the copy pair management tables 1124 of the respective storage systems acquired in S2305, checks for the presence or absence of remote copy pairs from the storage system selected in S2304 to the respective storage systems (S2307). That is, the storage management program 2104 checks whether or not the ID of the storage system selected in S2304 is in the copy pair management tables 1124 of the respective storage systems as the partner storage ID.

In a case where the remote copy pair does not exist (S2307: Yes), it is supposed that a storage add is allowed, and the storage management program 2104 updates the storage management table 2101 and ends the processing (S2308).

In cases where a remote copy pair exists in S2306 and S2307 (S2306: No, S2307: No), a storage add cannot be allowed, and as such, the storage management program. 2104 notifies the user of an error and ends the processing (S2309).

Furthermore, when a storage addition is successful, the storage management program 2104 redefines the representative storage system such that there is only one representative storage system in the virtual storage system. Furthermore, the storage management program 2104 consolidates the volume set representative management table that the add-target storage system possessed from before the addition of the storage system together with the volume set representative management table that the representative storage system of the virtual storage system possessed prior to the addition.

As in the above-described processes of S2306 and S2307, a check is performed as to whether or not an identified condition is being met (in S2306 and S2307, a check as to whether or not a remote copy pair exists between the storage systems that comprise the virtual storage system and the newly added storage system), and the storage addition is only allowed when the condition is satisfied. Consequently, a problematic configuration can be prevented.

According to the first example described hereinabove, the addition of a storage is allowed only in a case where a remote copy pair does not exist between a storage system that is already included in the virtual storage system and the storage system to be added anew. This makes it possible to prevent a remote copy pair from being formed in the same virtual storage system.

Figure 27:
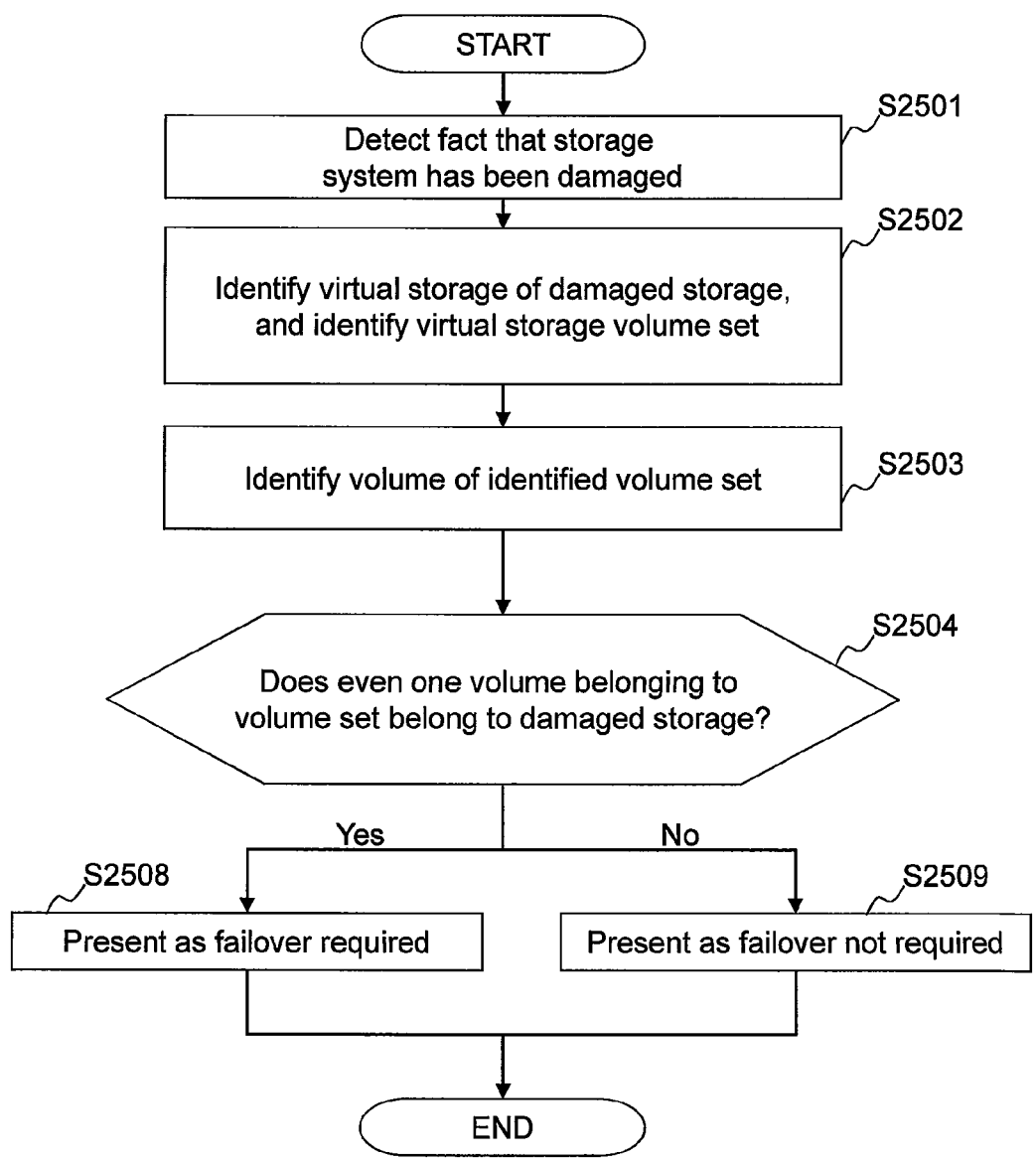
FIG. 27 is a flowchart of failover requirement determination process of the first example.

FIG. 27 is a flowchart of a failover requirement determination process of the first example.

A failover requirement determination process is for determining whether or not it is necessary to switch operations to the secondary storage system when the primary storage system included in the primary-side virtual storage system has been damaged.

In a case where a damaged storage system is one of the storage systems included in a virtual storage system, a failover may not be necessary when the storage system comprising the volume in which the actual data is being stored has not been damaged.

Figure 31:
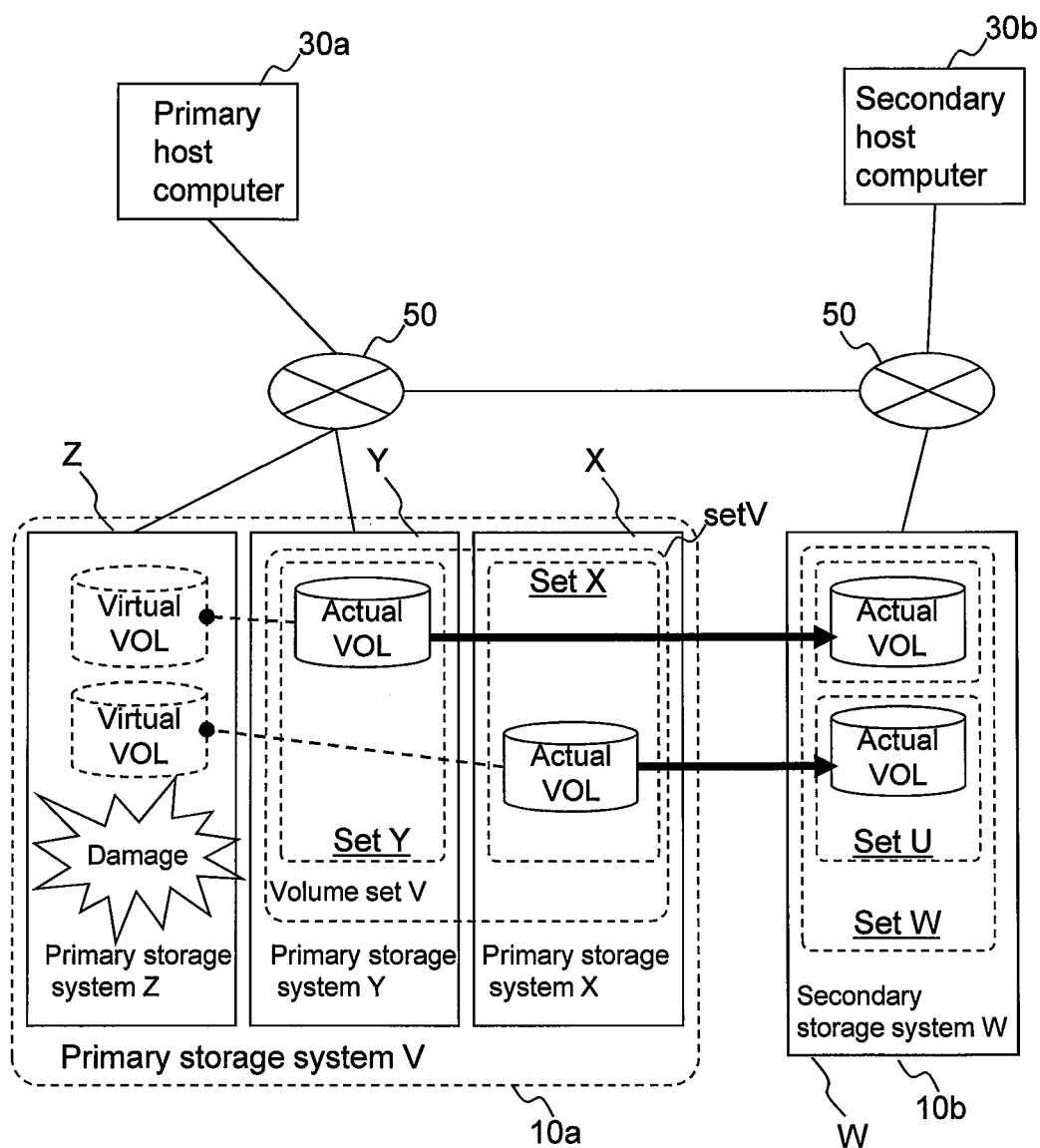
FIG. 31 is a diagram showing an example of the configuration of a storage system for which a failover is not required in the first example.

FIG. 31 is a diagram showing an example of the configuration of a storage system for which a failover is not required in the first example.

According to the example of FIG. 31, the situation is one in which a virtual storage system Z of the storage systems that are included in a primary storage system V is damaged. However, storage systems Y and X, which comprise actual volumes that belong to a volume set V, are not damaged, and the data can be accessed normally. For this reason, it is not necessary to execute a failover.

A situation like this will occur in a case where the primary storage system Z, which comprises the virtual volume, is subsequently added to the primary storage system V comprising the primary storage system Y and the primary storage system X, which comprise actual volumes, and a path to the primary storage system V by way of the primary storage system Z, which comprises the virtual volumes, has been added.

When the storage system is damaged, in a case where a function for executing the failover requirement determination process has been provided in the storage management program 2101, it is possible to determine whether or not a failover is necessary, and to present the user with this result. In accordance with this function, the user is able to check the fact that the storage system is damaged, and whether or not a failover must be executed as a result of this damage. This process will be explained below using the flowchart of FIG. 27.

The storage management program 2104, upon detecting that a storage system has been damaged (S2501), identifies the virtual storage system comprising the damaged storage system based on the storage management table 2101. Furthermore, the storage management program 2104 is able to detect whether or not a storage system has been damaged by regularly communicating with the storage system to check that communications are possible.

In addition, the storage management program 2104, based on the volume set consolidation management table 2103, identifies the virtual volume set of the relevant virtual storage system, and the volume set included in the virtual volume set (S2502).

The storage management program 2104 identifies the volumes allocated to the respective volume sets included in the virtual volume set identified in S2502 from the volume set management table 1123 of the storage system comprising the respective volume sets (S2503).

The storage management program 2104, based on the actual storage ID 21024 corresponding to the volume identified in S2503 in the volume consolidation management table 2102, checks whether a volume that belongs to the damaged storage system exists among the volumes identified in S2503 (S2504).

In a case where a volume belonging to the damaged storage exists in S2504 (S2504: Yes), the storage management program 2104 notifies the user that failover is required and ends the processing (S2508).

In a case where a volume belonging to the damaged storage does not exist in S2504 (S2504: No), the storage management program 2104 notifies the user that failover is not required and ends the processing (S2509). The user will instruct a failover in accordance with the notification.

According to the first example described hereinabove, the storage systems that are included in the same virtual storage can be managed as a single storage system. According to the first example, it is possible to prevent a remote copy pair from being formed between the storage systems included in the same virtual storage system.

Furthermore, even in a case where a volume set spanning the storage systems included in the same virtual storage system has been defined, it is possible to guarantee that the write update sequence to the primary-side volume and the write reflection sequence to the secondary-side volume are the same.

Furthermore, in this example, even in a case where a volume set spanning multiple storage systems has been defined, it is possible to guarantee that the write update sequence to the primary-side volume and the write reflection sequence to the secondary-side volume are the same by providing a representative storage system that controls the start of the write data reflection process to the secondary-side volume. That is, an arbitrary volume can be registered in the same volume set even in a virtual storage system (a scale-out storage system).

However, guaranteeing that the write update sequence and the write reflection sequence are the same may also be done by arranging all of the volumes defined in the same volume set in the same storage system. That is, the configuration may be such that the storage management program 2104 comprises a function for issuing an instruction to migrate the data of a certain volume to another volume, and a single storage system holds all of the remote copy source volumes (remote copy destination volumes). Since this enables the storage management program. 2104 to issue an instruction to the control program to migrate the volume data to an identified storage system prior to sending the control program the initial copy execution instruction when a remote copy pair create instruction has been received from the user, the write update sequence and the write reflection sequence can be made the same.

EXAMPLE 2

In a second example, a stand-alone management computer 60 is disposed in a one-to-one relationship with respect to each storage system 10*a* and 10*b*. The respective storage systems 10*a* and 10*b* are managed by the management computer 20 and the respective stand-alone management computers 60 (Refer to FIG. 28).

In a case where there is a stand-alone management computer 60 for managing a single storage system like this, the stand-alone management computer 60, by executing an illegal storage management, could wind up creating an illegal configuration in the computer system 1.

A process for detecting this kind of illegal configuration and notifying the user will be explained below. As used here, illegal storage management and illegal configuration signify the formation of a remote copy pair between storage systems included in the same virtual storage system. Furthermore, only the differences with respect to the first example will be explained in this example.

Figure 28:
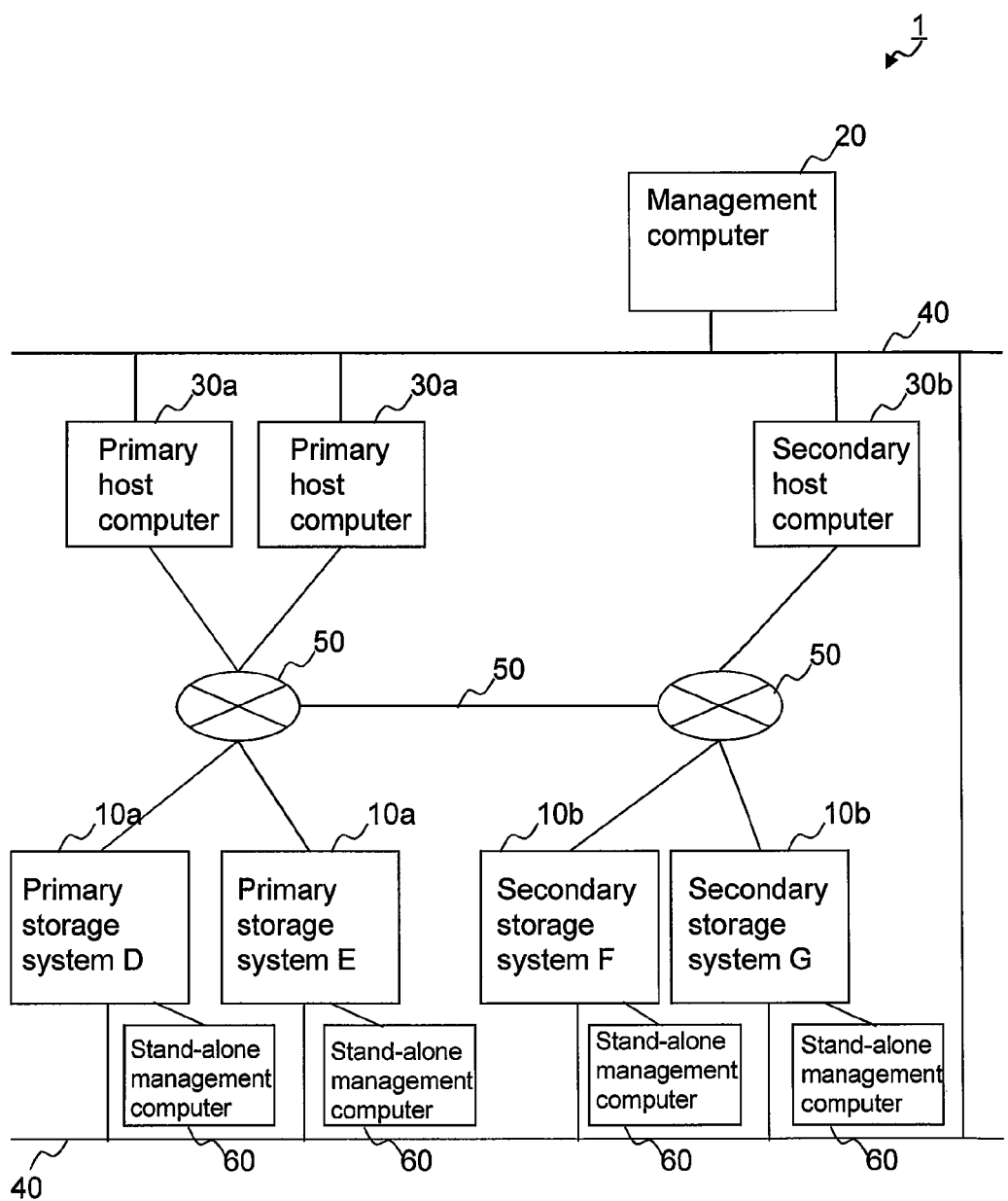
FIG. 28 is a diagram of the configuration of a computer system of a second example.

FIG. 28 shows an example of the configuration of the computer system 1 of the second example.

The difference with the first example, as mentioned above, is that a stand-alone management computer 60 is provided for each storage system 10*a* and 10*b*.

The management computer 20 and the stand-alone management computers 60 coexist in the computer system 1 of the second example. The management computer 20 mainly manages the multiple storage systems 10*a* and 10*b*. The stand-alone management computer 60 mainly manages the individual storage systems 10*a* and 10*b*.

Figure 29:
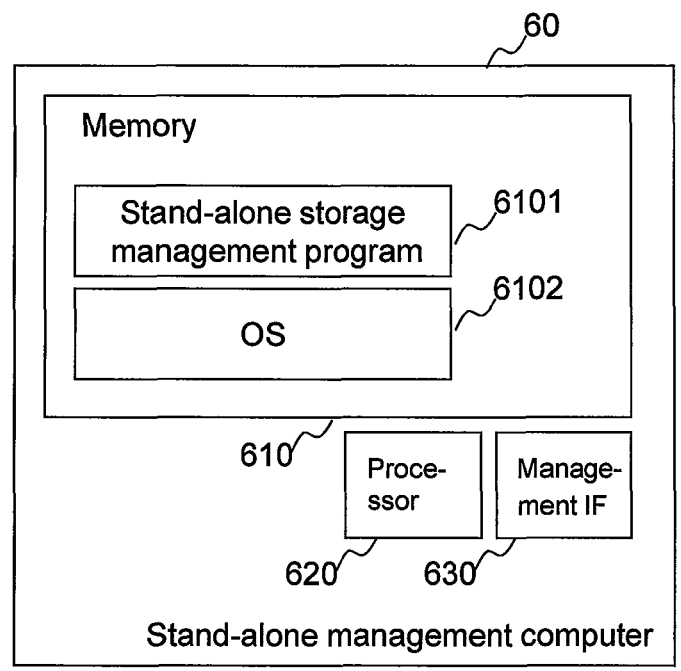
FIG. 29 is a diagram showing an example of the configuration of a stand-alone management computer of the second example.

FIG. 29 shows an example of the configuration of the stand-alone management computer 60 of the second example.

The hardware configuration of the stand-alone management computer 60 is practically the same as that of the management computer 20 of the first example, but the programs stored in the memory 610 differ. The programs stored in the memory 610 are a stand-alone storage management program 6101 for managing an individual storage system, and an OS 6102 for controlling the stand-alone storage management program 6101.

The stand-alone storage management program 6101 is used by the user to instruct the control program 1126 of the management target storage system via a user interface provided by the stand-alone storage management program to create a remote copy pair.

For example, when a request to create a remote copy pair from a volume of the management target storage system to a volume of a storage system coupled to this storage system is issued to the control program 1126, the control program 1126 updates the volume management table 1121, the volume set management table 1123, and the copy pair management table 1124 based on the instructed pair information, and starts the remote copy. However, the stand-alone management computer 60 is unable to collectively manage multiple storage systems, and does not manage the storage configuration related to a scale-out, such as a virtual storage system and the storage systems that comprise same.

For this reason, there may be cases in which a remote copy pair is formed between storages that are included in the same virtual storage system.

Figure 30:
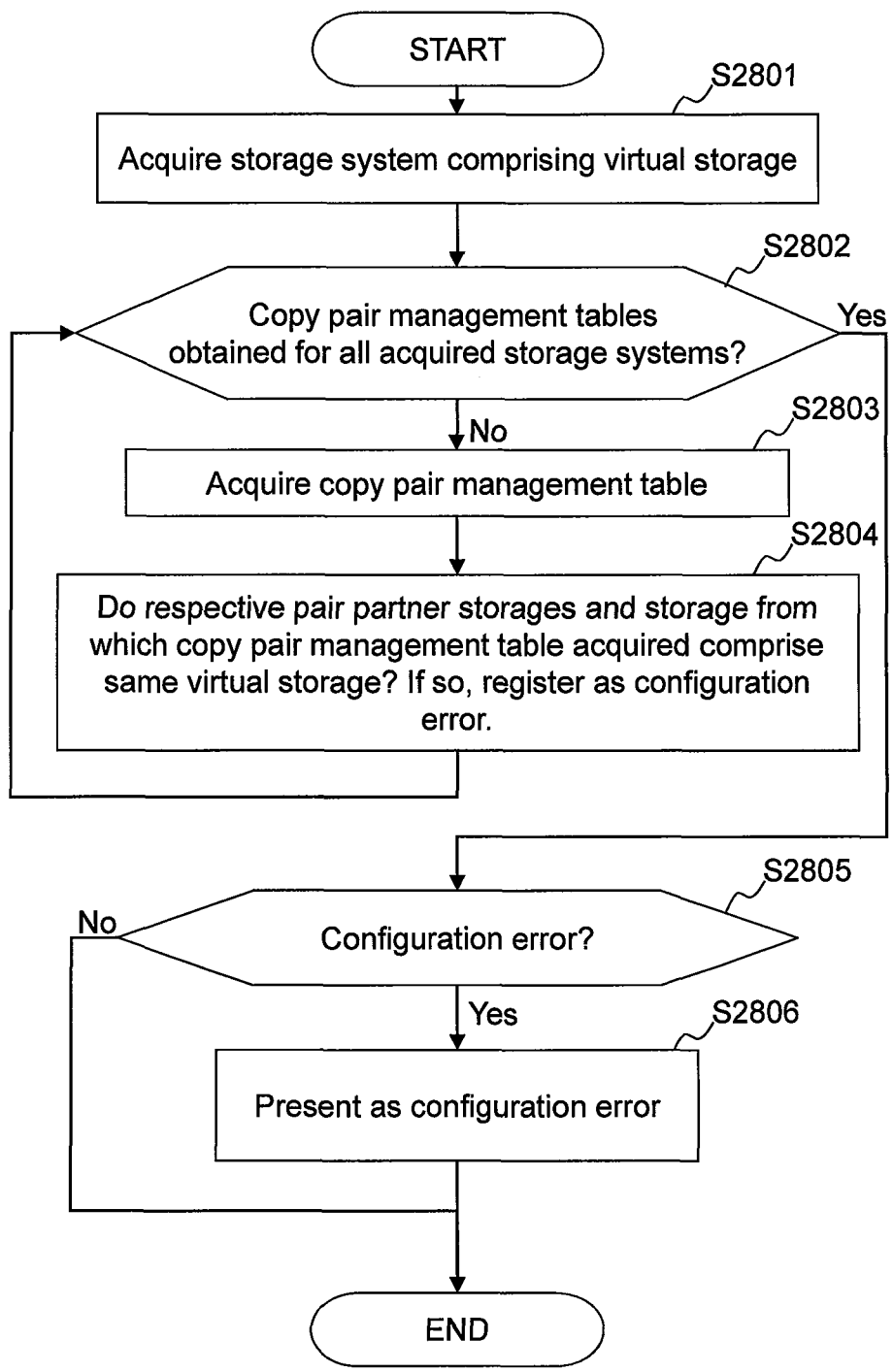
FIG. 30 is a flowchart of a configuration error determination process of the second example.

FIG. 30 is a flowchart of a configuration error determination process of the second example.

A configuration error determination process is one that determines whether there is a remote copy pair between storages included in the same virtual storage system.

The storage management program 2104 identifies the storage systems included in the virtual storage system based on the storage management table 2101 (S2801). Next, the storage management program 2104 checks whether or not the copy pair management table 1124 information was acquired with respect to the all the storage systems acquired in S2801 (S2802).

In a case where the information of the copy pair management table 1124 has not been acquired with respect to all of the storage systems (S2802: No), the storage management program 2104 acquires the information of the copy pair management table 1124 from the storage systems with respect to which this information has not been acquired (S2803). In a case where the information of the copy pair management table 1124 has been acquired with respect to all of the storage systems (S2802: Yes), the storage management program 2104 performs the processing of S2805 and subsequent steps.

The storage management program 2104 acquires the ID registered in the partner storage ID 11243, which is the copy destination, for each pair (each pair registered in the copy pair management table 1124 acquired in S2803).

Next, the storage management program 2104, based on the storage management table 2101, determines whether or not the storage system(s) from which the copy pair management table (s) 1124 were acquired in S2803 and the storage system(s) identified from the acquired ID (s) are storages that are included in the same virtual storage system, and if the storages are included in the same virtual storage system, holds the pair information as a configuration error (S2804).

In a case where it has been determined in S2802 that copy pair information tables have been obtained from all the storage systems (S2802: Yes), the storage management program 2104 checks for the presence or absence of a pair that has been registered as a configuration error in S2804 (S2805).

In a case where there is a pair that has been registered as a configuration error (S2805: Yes), the storage management program 2104 presents the relevant pair to the user as a configuration error, and ends the processing. In a case where in S2805 no pair has been registered as a configuration error (S2805: No), the storage management program 2104 ends the processing as-is.

In the above-described processing, the storage management program 2104 checks for the presence or absence of a configuration that satisfies a specific condition (S2804), and in a case where a configuration that meets the condition is discovered, presents same to the user as a configuration error (S2806). In accordance with to this process, the user is able to check for a specific configuration status in the computer system 1, and to make a determination as to whether or not a configuration revision is necessary.

According to the second example described hereinabove, even in a case where the computer system comprises an illegal configuration, such as the formation of a remote copy pair between storage systems that are included in the same virtual storage system, this illegal configuration can be detected and presented to the user.

A number of examples of the present invention have been explained hereinabove, but these are examples for illustrating the present invention, and do not purport to limit the scope of the present invention to these examples. The present invention can be put into practice in a variety of other modes.

For example, it is possible to avoid a situation in which a copy source volume, which comprises a remote copy pair with a copy destination volume, exists in the virtual storage system comprising this copy destination volume.

REFERENCE SIGNS LIST

1 Computer system
10*a* Primary storage system
10*b* Secondary storage system
20 Management computer

The invention claimed is:

1. A management system coupled to a plurality of storage systems including a plurality of logical volumes, comprising:
a processor; and
a memory storing instructions, which are executable by the processor, and management information which includes an identifier of a consistency group, an identifier of the storage systems and an identifier of the logical volumes, wherein the consistency group is a group of the logical volumes which maintain compatibility of data with each other, and
wherein the processor is configured to:
receive a request for a remote copy including an identifier of a logical volume of a source of the remote copy and an identifier of a logical volume of a destination of the remote copy;
identify the consistency group corresponding to the logical volume of the source of the remote copy and the consistency group corresponding to the logical volume of the destination of the remote copy by referring to the management information; and
copy data from the logical volume of the source of the remote copy to the logical volume of the destination of the remote copy and set a remote copy pair between the logical volume of the source of the remote copy and the logical volume of the destination of the remote copy, if the consistency group of the logical volume of the source of the remote copy is not equal to the consistency group of the logical volume of the destination of the remote copy.

2. The management system according to claim 1,
wherein the consistency group corresponds to a virtual storage system.

3. The management system according to claim 2,
wherein the logical volume of the source of the remote copy corresponds to a virtual volume.

4. The management system according to claim 3,
wherein the virtual storage system includes a plurality of volume sets, and
wherein the volume sets include a group of logical volumes of the source of the remote copy and a group of logical volumes of the destination of the remote copy.

5. The management system according to claim 4,
wherein the logical volumes of the destination of the remote copy correspond to actual volumes.

6. In a management system coupled to a plurality of storage systems including a plurality of logical volumes, the management system having a processor; and a memory storing instructions, which are executable by the processor, and management information which includes an identifier of a consistency group, an identifier of the storage systems and an identifier of the logical volumes, wherein the consistency group is a group of the logical volumes which maintain compatibility of data with each other, a method performed by the processor comprising the steps of:
receiving a request for a remote copy including an identifier of a logical volume of a source of the remote copy and an identifier of a logical volume of a destination of the remote copy;
identifying the consistency group corresponding to the logical volume of the source of the remote copy and the consistency group corresponding to the logical volume of the destination of the remote copy by referring to the management information; and
copying data from the logical volume of the source of the remote copy to the logical volume of the destination of the remote copy and set a remote copy pair between the logical volume of the source of the remote copy and the logical volume of the destination of the remote copy, if the consistency group of the logical volume of the source of the remote copy is not equal to the consistency group of the logical volume of the destination of the remote copy.

7. The method according to claim 6,
wherein the consistency group corresponds to a virtual storage system.

8. The method according to claim 7,
wherein the logical volume of the source of the remote copy corresponds to a virtual volume.

9. The method according to claim 8,
wherein the virtual storage system includes a plurality of volume sets, and
wherein the volume sets include a group of logical volumes of the source of the remote copy and a group of logical volumes of the destination of the remote copy.

10. The method according to claim 9,
wherein the logical volumes of the destination of the remote copy correspond to actual volumes.

11. A non-transitory computer readable storage medium in a management system coupled to a plurality of storage systems including a plurality of logical volumes, the non-transitory computer readable storage medium storing instructions, which are executable by a processor, and management information which includes an identifier of a consistency group, an identifier of the storage systems and an identifier of the logical volumes, wherein the consistency group is a group of the logical volumes which maintain compatibility of data with each other, the non-transitory computer readable medium comprising:
  code for receiving a request for a remote copy including an identifier of a logical volume of a source of the remote copy and an identifier of a logical volume of a destination of the remote copy;
  code for identifying the consistency group corresponding to the logical volume of the source of the remote copy and the consistency group corresponding to the logical volume of the destination of the remote copy by referring to the management information; and
  code for copying data from the logical volume of the source of the remote copy to the logical volume of the destination of the remote copy and set a remote copy pair between the logical volume of the source of the remote copy and the logical volume of the destination of the remote copy, if the consistency group of the logical volume of the source of the remote copy is not equal to the consistency group of the logical volume of the destination of the remote copy.

12. The non-transitory computer readable medium according to claim 11,
wherein the consistency group corresponds to a virtual storage system.

13. The non-transitory computer readable medium according to claim 12,
wherein the logical volume of the source of the remote copy corresponds to a virtual volume.

14. The non-transitory computer readable medium according to claim 13,
wherein the virtual storage system includes a plurality of volume sets, and
wherein the volume sets include a group of logical volumes of the source of the remote copy and a group of logical volumes of the destination of the remote copy.

15. The non-transitory computer readable medium according to claim 14,
wherein the logical volumes of the destination of the remote copy correspond to actual volumes.

* * * * *